United States Patent
Sorenson et al.

(10) Patent No.: US 10,402,358 B2
(45) Date of Patent: Sep. 3, 2019

(54) MODULE AUTO ADDRESSING IN PLATFORM BUS

(71) Applicant: Honeywell International Inc., Morris Plains, NJ (US)

(72) Inventors: Ronald Sorenson, Columbus, OH (US); Paul Patton, Golden Valley, MN (US); Rick Solosky, Plymouth, MN (US); Rolf L. Strand, Crystal, MN (US); John Evers, Albany, MN (US); Patrick Springman, Andover, MN (US); Yury Millman, Golden Valley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 498 days.

(21) Appl. No.: 14/869,608

(22) Filed: Sep. 29, 2015

(65) Prior Publication Data

US 2016/0092388 A1 Mar. 31, 2016

Related U.S. Application Data

(60) Provisional application No. 62/057,638, filed on Sep. 30, 2014.

(51) Int. Cl.
*G06F 13/40* (2006.01)
*G05B 19/05* (2006.01)
(Continued)

(52) U.S. Cl.
CPC ......... *G06F 13/4068* (2013.01); *F24D 19/10* (2013.01); *G05B 19/054* (2013.01); *G06F 13/4282* (2013.01); *G05B 2219/1131* (2013.01)

(58) Field of Classification Search
CPC ....... G06F 13/40; G06F 13/42; G05B 19/054; G05B 2219/1131; F24D 19/19
See application file for complete search history.

(56) References Cited

U.S. PATENT DOCUMENTS

| 3,425,780 A | 2/1969 | Potts |
| 3,520,645 A | 7/1970 | Cotton et al. |

(Continued)

FOREIGN PATENT DOCUMENTS

| EP | 0325356 | 7/1989 |
| EP | 0276937 | 7/1991 |

(Continued)

OTHER PUBLICATIONS

Steve Karg, IMproving BACnet MS/TP, Nov. 2010.*

(Continued)

*Primary Examiner* — Henry Tsai
*Assistant Examiner* — Christopher Daley
(74) *Attorney, Agent, or Firm* — Seager, Tufte & Wickhem LLP

(57) ABSTRACT

A system and approach for addressing modules on a platform bus that may incorporate a master module and one or more slave modules. The platform bus may run through sub-base connectors that interlock modules together on a rail. Addressing of the modules may occur automatically and dynamically in that the master module may have a first address by default, and a first slave module adjoining the master module may be assigned a second address. A second slave module adjoining the first slave module, if there is one, may be assigned a third address. Each of the other slave modules, adjoining a preceding slave module assigned an address, may be assigned a next address after an address assigned to a preceding slave module. Addresses may be assigned in a numerical order to each module based on a physical position of the respective module on a rail.

19 Claims, 24 Drawing Sheets

(51) Int. Cl.
*F24D 19/10* (2006.01)
*G06F 13/42* (2006.01)

(56) References Cited

U.S. PATENT DOCUMENTS

| | | |
|---|---|---|
| 3,649,156 A | 3/1972 | Conner |
| 3,681,001 A | 8/1972 | Potts |
| 3,836,857 A | 9/1974 | Ikegami et al. |
| 3,909,816 A | 9/1975 | Teeters |
| 4,157,506 A | 6/1979 | Spencer |
| 4,221,557 A | 9/1980 | Jalics |
| 4,242,079 A | 12/1980 | Matthews |
| 4,269,589 A | 5/1981 | Matthews |
| 4,280,184 A | 7/1981 | Weiner et al. |
| 4,303,385 A | 12/1981 | Rudich, Jr. et al. |
| 4,370,557 A | 1/1983 | Axmayk et al. |
| 4,450,499 A | 5/1984 | Sorelle |
| 4,457,692 A | 7/1984 | Erdman |
| 4,483,672 A | 11/1984 | Wallace et al. |
| 4,519,771 A | 5/1985 | Six et al. |
| 4,521,825 A | 6/1985 | Crawford |
| 4,527,247 A | 7/1985 | Kaiser et al. |
| 4,555,800 A | 11/1985 | Nishikawa et al. |
| 4,622,005 A | 11/1986 | Kuroda |
| 4,626,193 A | 12/1986 | Gann |
| 4,641,108 A | 2/1987 | Gill, Jr. |
| 4,655,705 A | 4/1987 | Shute et al. |
| 4,672,324 A | 6/1987 | van Kampen |
| 4,695,246 A | 9/1987 | Bellfuss et al. |
| 4,701,878 A * | 10/1987 | Gunkel ............... G06F 12/0661 710/104 |
| 4,709,155 A | 11/1987 | Yamaguchi et al. |
| 4,777,607 A | 10/1988 | Maury et al. |
| 4,830,601 A | 5/1989 | Dahlander et al. |
| 4,842,510 A | 6/1989 | Grunden et al. |
| 4,843,084 A | 6/1989 | Parker et al. |
| 4,872,828 A | 10/1989 | Mierzwinski et al. |
| 4,904,986 A | 2/1990 | Pinckaers |
| 4,949,355 A | 8/1990 | Dyke et al. |
| 4,955,806 A | 9/1990 | Grunden et al. |
| 5,026,270 A | 6/1991 | Adams et al. |
| 5,026,272 A | 6/1991 | Takahashi et al. |
| 5,037,291 A | 8/1991 | Clark |
| 5,073,769 A | 12/1991 | Kompelien |
| 5,077,550 A | 12/1991 | Cormier |
| 5,112,117 A | 5/1992 | Altmann et al. |
| 5,126,721 A | 6/1992 | Butcher et al. |
| 5,158,477 A | 10/1992 | Testa et al. |
| 5,175,439 A | 12/1992 | Harer et al. |
| 5,222,888 A | 6/1993 | Jones et al. |
| 5,236,328 A | 8/1993 | Tate et al. |
| 5,255,179 A | 10/1993 | Zekan et al. |
| 5,276,630 A | 1/1994 | Baldwin et al. |
| 5,280,802 A | 1/1994 | Comuzie, Jr. |
| 5,300,836 A | 4/1994 | Cha |
| 5,347,982 A | 9/1994 | Blazer et al. |
| 5,365,223 A | 11/1994 | Sigafus |
| 5,391,074 A | 2/1995 | Meeker |
| 5,424,554 A | 6/1995 | Marran et al. |
| 5,446,677 A | 8/1995 | Jensen et al. |
| 5,472,336 A | 12/1995 | Adams et al. |
| 5,506,569 A | 4/1996 | Rowlette |
| 5,567,143 A | 10/1996 | Servidio |
| 5,599,180 A | 2/1997 | Peters et al. |
| 5,682,329 A | 10/1997 | Seem et al. |
| 5,722,823 A | 3/1998 | Hodgkiss |
| 5,797,358 A | 8/1998 | Brandt et al. |
| 5,971,745 A | 10/1999 | Bassett et al. |
| 6,060,719 A | 5/2000 | DiTucci et al. |
| 6,071,114 A | 6/2000 | Cusack et al. |
| 6,084,518 A | 7/2000 | Jamieson |
| 6,172,432 B1 | 1/2001 | Schnackenberg et al. |
| 6,222,719 B1 | 4/2001 | Kadah |
| 6,261,086 B1 | 7/2001 | Fu |
| 6,282,454 B1 * | 8/2001 | Papadopoulos ........ G05B 19/05 700/67 |
| 6,299,433 B1 | 10/2001 | Gauba et al. |
| 6,346,712 B1 | 2/2002 | Popovic et al. |
| 6,349,156 B1 | 2/2002 | O'Brien et al. |
| 6,356,827 B1 | 3/2002 | Davis et al. |
| 6,381,503 B1 | 4/2002 | Dollhopf et al. |
| 6,385,510 B1 | 5/2002 | Hoog |
| 6,457,692 B1 | 10/2002 | Gohl, Jr. |
| 6,474,979 B1 | 11/2002 | Rippelmeyer |
| 6,486,486 B1 | 11/2002 | Haupenthal |
| 6,509,838 B1 | 1/2003 | Payne et al. |
| 6,552,865 B2 | 4/2003 | Cyrusian |
| 6,676,404 B2 | 1/2004 | Lochschmied |
| 6,743,010 B2 | 6/2004 | Bridgeman et al. |
| 6,782,345 B1 | 8/2004 | Siegel et al. |
| 6,794,771 B2 | 9/2004 | Orloff |
| 6,912,671 B2 | 6/2005 | Christensen et al. |
| 6,917,888 B2 | 7/2005 | Logvinov et al. |
| 6,923,640 B2 | 8/2005 | Canon |
| 7,035,951 B2 * | 4/2006 | Bui ...................... H04L 12/403 370/475 |
| 7,076,311 B2 | 7/2006 | Schuster |
| 7,088,137 B2 | 8/2006 | Behrendt et al. |
| 7,088,253 B2 | 8/2006 | Grow |
| 7,202,794 B2 | 4/2007 | Huseynov et al. |
| 7,241,135 B2 | 7/2007 | Munsterhuis et al. |
| 7,242,116 B2 | 7/2007 | Kawazu et al. |
| 7,255,285 B2 | 8/2007 | Troost et al. |
| 7,274,973 B2 | 9/2007 | Nichols et al. |
| 7,289,032 B2 | 10/2007 | Seguin et al. |
| 7,327,269 B2 | 2/2008 | Kiarostami |
| 7,433,740 B2 * | 10/2008 | Hesse .................... G05B 15/02 700/1 |
| 7,617,691 B2 | 11/2009 | Street et al. |
| 7,728,736 B2 | 6/2010 | Leeland et al. |
| 7,764,182 B2 * | 7/2010 | Chian ..................... F23N 5/123 340/577 |
| 7,768,410 B2 | 8/2010 | Chian |
| 7,800,508 B2 | 9/2010 | Chian et al. |
| 8,010,714 B2 * | 8/2011 | Simon ................. G06F 12/0661 710/10 |
| 8,050,801 B2 * | 11/2011 | Richards ............... F24F 11/006 370/254 |
| 8,085,521 B2 | 12/2011 | Chian |
| 8,299,559 B2 | 10/2012 | Nazarian |
| 8,390,324 B2 | 3/2013 | Fletcher et al. |
| 8,601,291 B2 | 12/2013 | Ewing et al. |
| 8,769,158 B2 | 7/2014 | Kretschmann et al. |
| 9,100,397 B2 * | 8/2015 | Li ........................ H04L 63/0876 |
| 2002/0099474 A1 | 7/2002 | Khesin |
| 2002/0133573 A1 * | 9/2002 | Matsuda ........... H04L 29/12009 709/220 |
| 2002/0138156 A1 * | 9/2002 | Wong ..................... G06F 9/4405 700/8 |
| 2002/0138225 A1 * | 9/2002 | Wong ..................... G06F 9/4405 702/119 |
| 2003/0143503 A1 | 7/2003 | Wild et al. |
| 2003/0222982 A1 | 12/2003 | Hamdan et al. |
| 2004/0111501 A1 * | 6/2004 | Lee ....................... H04L 12/2803 709/222 |
| 2004/0209209 A1 | 10/2004 | Chodacki et al. |
| 2005/0086341 A1 | 4/2005 | Enga et al. |
| 2006/0123168 A1 * | 6/2006 | Lang .................... G06F 13/4256 710/110 |
| 2006/0257805 A1 | 11/2006 | Nordberg et al. |
| 2007/0159978 A1 | 7/2007 | Anglin et al. |
| 2007/0188971 A1 | 8/2007 | Chian et al. |
| 2008/0027587 A1 * | 1/2008 | Nickerson .............. A01G 25/16 700/284 |
| 2009/0009344 A1 | 1/2009 | Chian |
| 2009/0056649 A1 | 3/2009 | MacKenzie |
| 2009/0136883 A1 | 5/2009 | Chian et al. |
| 2009/0271001 A1 * | 10/2009 | Westphal ............... G05B 15/02 700/3 |
| 2010/0013644 A1 | 1/2010 | McDonald et al. |
| 2010/0196990 A1 * | 8/2010 | Svendsen ................ C12N 9/54 435/221 |

(56) References Cited

U.S. PATENT DOCUMENTS

| | | |
|---|---|---|
| 2010/0265075 A1 | 10/2010 | Chian |
| 2011/0207064 A1 | 8/2011 | Salani et al. |
| 2012/0004739 A1* | 1/2012 | Sato ................ H04L 12/282 700/7 |
| 2012/0098445 A1* | 4/2012 | Park ................ H05B 37/0272 315/193 |
| 2012/0191226 A1* | 7/2012 | Nordberg ................ G05B 9/02 700/79 |
| 2013/0086195 A1* | 4/2013 | Hiniker ................ H04L 12/2836 709/208 |
| 2013/0173883 A1* | 7/2013 | Cho ................ G06F 12/1009 711/207 |
| 2013/0253709 A1* | 9/2013 | Renggli ................ H04L 12/2821 700/278 |
| 2014/0229647 A1* | 8/2014 | Tsirkin ................ G06F 13/24 710/268 |
| 2016/0091204 A1 | 3/2016 | Patton et al. |
| 2016/0091205 A1 | 3/2016 | Solosky et al. |
| 2016/0091903 A1 | 3/2016 | Patton et al. |
| 2016/0098055 A1 | 4/2016 | Solosky et al. |
| 2016/0123624 A1 | 5/2016 | Solosky |

FOREIGN PATENT DOCUMENTS

| | | |
|---|---|---|
| EP | 0967440 | 12/1999 |
| EP | 1148298 | 10/2001 |
| EP | 2388960 | 12/2012 |
| WO | WO 91/02300 | 2/1991 |
| WO | WO 97/18417 | 5/1997 |
| WO | WO 2005/098954 | 10/2005 |
| WO | WO 2008/144308 | 11/2008 |

OTHER PUBLICATIONS

ABB, BACnet Protocol ACH550 AC Drives, 2005.*
Honeywell, "S4965 SERIES Combinqd Valve and Boiler Control Systems," 16 pages, prior to Jul. 3, 2007.
Honeywell, "SV9410/SV9420; SV9510/SV9520; SV9610/SV9620 SmartValve System Controls," Installation Instructions, 16 pages, 2003.
www.playhookey.com, "Series LC Circuits," 5 pages, printed Jun. 15, 2007.
Benson et al., "Power Plant MOM (Multimedia Operation and Monitoring)," 9 pages, prior to Mar. 28, 2013.
Buxton, "Totally Reconfigurable Analog Circuit, Concept and Practical Implementation," IEEE, pp. 292-295, 1999.
Description of "Smart Analog, Press Release," Renesas Electronics, 1 page, prior to Mar. 29, 2013. (Unable to obtain the actual press release, the description only is provided).
Fireye, "YB110/YB230 FIREYE BurnerLogiX, Microprocessor-Based Integrated Burner Management Cotnrol," 62 pages, May 4, 2011.
Honeywell, "R7910A SOLA HC (Hydronic Control), R7911 SOLA SC (Steam Control), Product Data," 122 pages, Nov. 2009.
https://www.rensas.com/en-us/products/smart-analog/smart-analog-f . . . , "Smart Analog Features," Renesas Electronics, 4 pages, printed Jun. 28, 2016.
Huebner et al., "Real-Time LUT-Based Network Topologies for Dynamic and Partial FPGA Self-Reconfiguration," ACM, pp. 28-32, 2004.
Rockwell Automation Inc., "GuardLogix Integrated Safety System," 1 page, 2013.
Siemens Building Technologies, "Combustion Control Systems," 12 pages, Nov. 11, 2005.

* cited by examiner

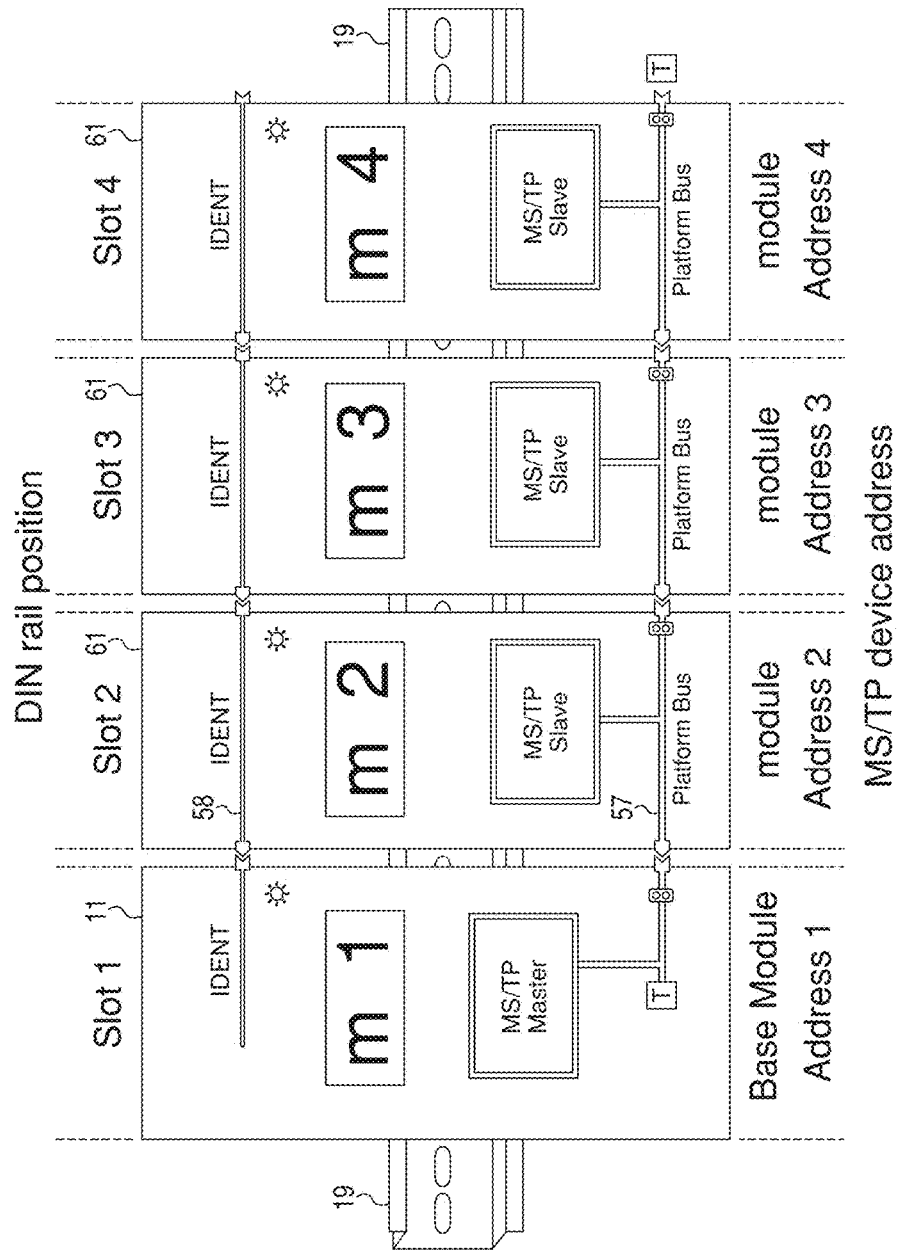

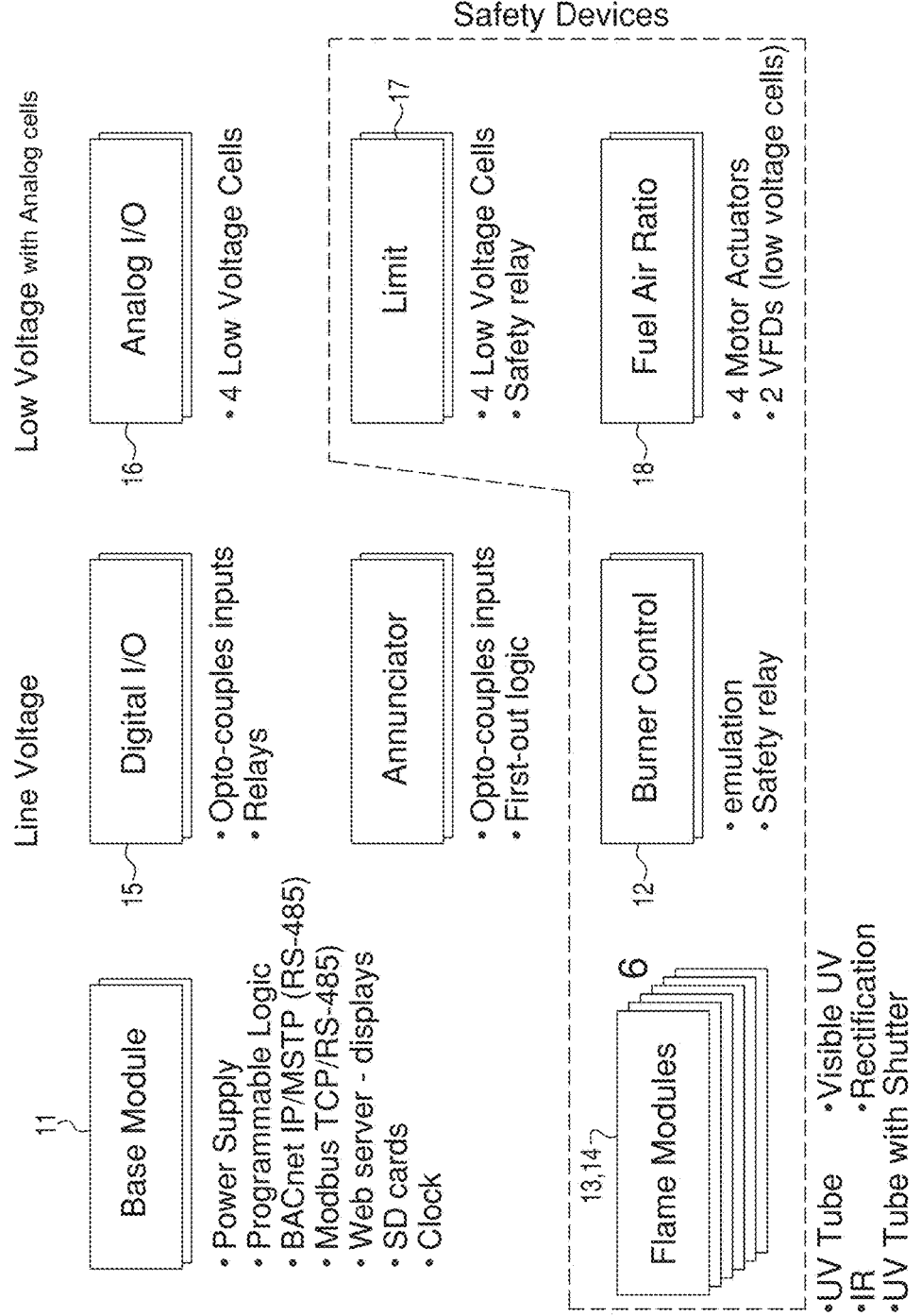

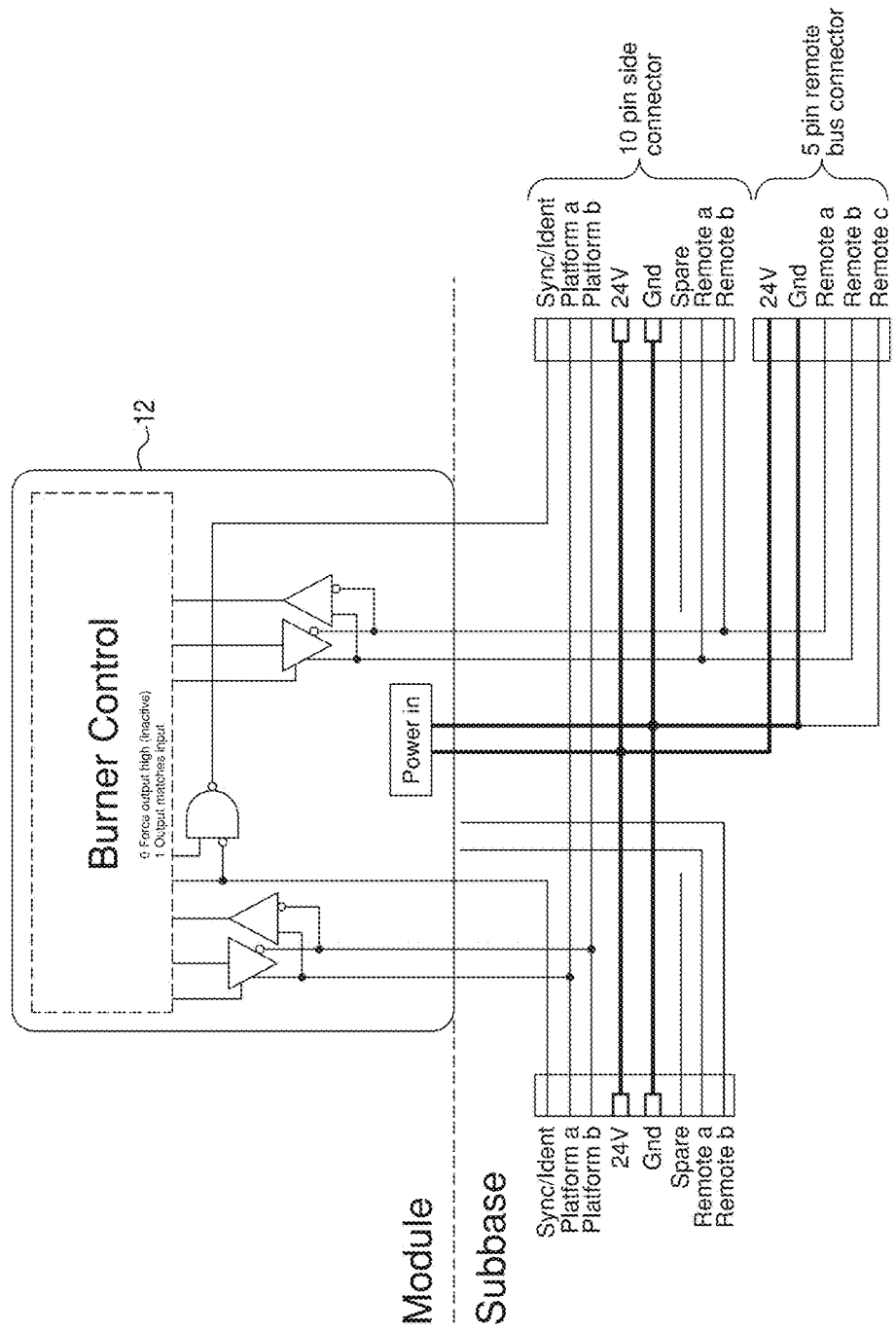

FIG. 13

| Data | Size (bytes) | Value |
|---|---|---|
| Preamble | 2 | 0x55FF |
| Frame type | 1 | 128=AUTO Address mode |
| Destination address | 1 | 255=broadcast address |
| Source address | 1 | 1=Base module address |
| Data length | 2 | 2=Length of data field |
| Header CRC | 1 | CRC of header only |
| Vendor ID | 2 | 17=Vendor identification code |
| Total assigned addresses | 1 | Total number of previous assigned addresses (n+1) |
| Base module address | 1 | 1=Base module device address |
| Assigned addresses | n | Previous assignments for other slave modules |
| Data CRC | 2 | CRC of data only |

AUTO Address message data structure

FIG. 14

| Data | Size (bytes) | Value |
|---|---|---|
| Preamble | 2 | 0x55FF |
| Frame type | 1 | 129=END AUTO Address mode |
| Destination address | 1 | 255=broadcast address |
| Source address | 1 | 1=Base module address |
| Data length | 2 | 4=Length of data field |
| Header CRC | 1 | CRC of header only |
| Vendor ID | 2 | 17=Vendor identification code |
| Total assigned addresses | 2 | Total number of previous assigned addresses |
| Data CRC | 2 | CRC of data only |

AUTO Address end message data structure

FIG. 15

| Data | Size (bytes) | Value |
|---|---|---|
| Preamble | 2 | 0x55FF |
| Frame type | 1 | 130=OFFER Address mode |
| Destination address | 1 | 255=broadcast address |
| Source address | 1 | 1=Base module address |
| Data length | 2 | (n x 14) + 6=Length of data field (n=Total assigned) |
| Header CRC | 1 | CRC of header only |
| Vendor ID | 2 | 17=Vendor identification code |
| Next address | 1 | Address for next assignment |
| Total assigned | 1 | Total number of assigned addresses |
| Assigned address | 1 | 1=Base module device address |
| ... | n | Assignments for other slave modules |
| Data CRC | 2 | CRC of data only |

OFFER Address message data structure

FIG. 16

| Data | Size (bytes) | Value |
|---|---|---|
| Preamble | 2 | 0x55FF |
| Frame type | 1 | 131=ASSIGN Address mode |
| Destination address | 1 | 1=Base module address |
| Source address | 1 | Address requested by module |
| Data length | 2 | 14=Length of data field |
| Header CRC | 1 | CRC of header only |
| Vendor ID | 2 | 17=Vendor identification code |
| Module type | 10 | Module type |
| Serial number | 12 | Module serial number |
| Data CRC | 2 | CRC of data only |

ASSIGN Address request message data structure

FIG. 17

| Data | Size (bytes) | Value |
|---|---|---|
| Preamble | 2 | 0x55FF |
| Frame type | 1 | 132=CONFIRM Address |
| Destination address | 1 | Module's assigned device address |
| Source address | 1 | 1=Base module address |
| Data length | 2 | 2=Length of data field |
| Header CRC | 1 | CRC of header only |
| Vendor ID | 2 | 17=Vendor identification code |
| Module type | 10 | Module type from ASSIGN address request |
| Serial number | 12 | Module serial number from ASSIGN address request |
| Data CRC | 2 | CRC of data only |

CONFIRM Address message data structure

FIG. 18

| Data | Size (bytes) | Value |
|---|---|---|
| Preamble | 2 | 0x55FF |
| Frame type | 1 | 133=ACKnowledge Address |
| Destination address | 1 | 1=Base module address |
| Source address | 1 | Module address |
| Data length | 2 | n+14=Length of data field (n=size of OS number) |
| Header CRC | 1 | CRC of header only |
| Vendor ID | 2 | 17=Vendor identification code |
| Module Type | 10 | Module type |
| Serial number | 12 | Module serial number (left justified, NULL filled) |
| OS number | n | OS model number (1 to 12 characters) |
| Data CRC | 2 | CRC-16 polynomial |

Address acknowledgement message data structure

MODULE AUTO ADDRESSING IN PLATFORM BUS

The present application claims the benefit of Provisional Patent Application No. 62/057,638, filed Sep. 30, 2014. Provisional Patent Application No. 62/057,638, filed Sep. 30, 2014, is hereby incorporated by reference.

BACKGROUND

The present disclosure pertains to design, control, sensing and addressing relating to heating systems.

SUMMARY

The disclosure reveals a system and approach for addressing modules on a platform bus that may incorporate a master module and one or more slave modules. The platform bus may be a network that runs through sub-base connectors that interlock the modules together on a rail. An identification signal line may run through the modules via the sub-base connectors. Addressing of the modules may occur automatically and dynamically in that the master module may have a first address by default, and a first slave module adjoining the master module may be assigned a second address. A second slave module adjoining the first slave module, if there is one, may be assigned a third address. Each of the other slave modules, adjoining a preceding slave module assigned an address, may be assigned a next address after an address assigned to a preceding slave module. Addresses may be allocated and assigned in a numerical order to each module based on a physical position of the respective module on a rail. The assigning addresses to the slave modules may be performed with a signal via the identification signal line. The master module may be the control or base module and the slave modules may be input/output, annunciator, and other kinds of modules.

BRIEF DESCRIPTION OF THE DRAWING

FIG. 8 is a diagram of addressing according to rail position;

FIG. 9 is a diagram of a configuration layout of the various modules or devices and their components relating to the present system;

FIGS. 9b, 9c, 9d and 9e indicate connections among a base module, a limit control module, IO modules, a fuel air module, a burner control, and a flame amplifier;

FIGS. 13-18 are diagrams of example message data structures used in auto addressing.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Figure 1:
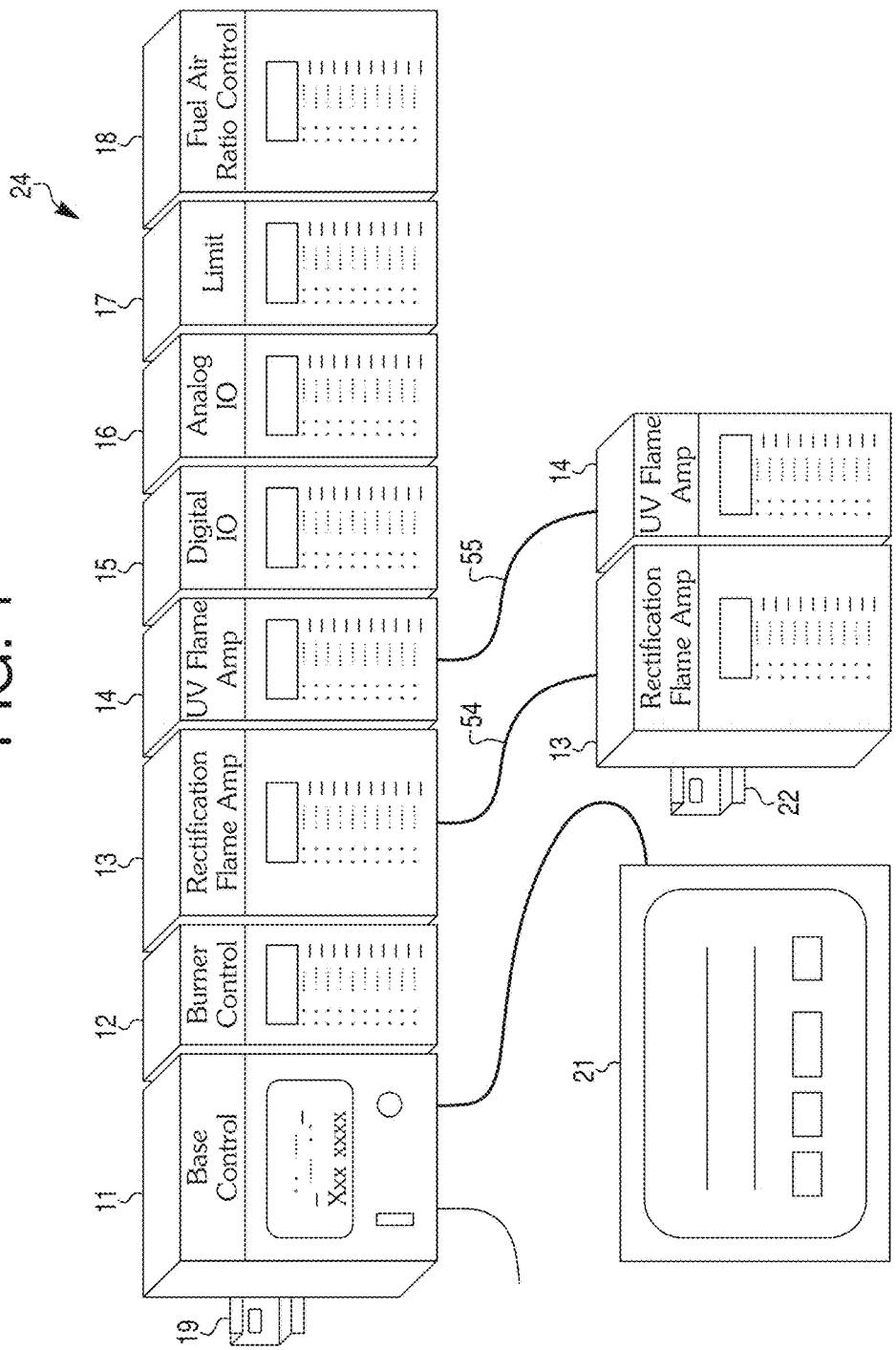
FIG. 1 is a diagram of the present system with example interconnected modules on a rail.

The present system may have a modular control that integrates configurable safety devices with user-programmable logic, inputs, and outputs. The system may allow an equipment manufacturer to create a customized controller by selecting modules and input/output (I/O) specifically for that equipment, and then designing a customized control program to make these items work together. The modules may be mounted on a DIN rail and each module may include side-by-side plugs and jacks to interconnect adjacent modules. Mounting the devices on a DIN rail may also interconnect them. FIG. 1 is a diagram of the present system with example interconnected modules 11, 12, 13, 14, 15, 16, 17 and 18 on a DIN rail 19.

In control systems, a base or control panel module 11 may often contain a programmable logic controller (PLC) combined with separate safety devices such as burner controls 12. Safety devices may be separately responsible for the operation and the safety of critical equipment. Safety modules may operate as discrete and self-contained safety controls. In a system, the data produced by the safety modules may be connected to the non-safety programmable logic via wires and special logic may be used to infer what the control is doing. Or if the control includes communication, then the programmable logic may capture and interpret this using specialized custom software. In the present system, all safety module status data and all non-safety control of safety modules (such as a burner control call-for-heat signal) may be integrated with the programmable logic. There may be one system, even though the safety modules are independent.

The base module 11 may provide communication and user-programmable logic; and non-safety digital and analog I/O modules 15 and 16 may provide inputs and outputs for that logic. The programmable logic may be used to create any non-safety features needed by the equipment that the device is controlling. The programmable logic may allow an application designer to implement customized and differentiating features in a controller. To accompany this, present system may also include a completely configurable color touch screen display 21.

The system may be an array of modules 11-18 mounted together on one DIN rail 19 that work together to implement a control device for specific equipment. The minimum number of modules that may be used is two and the practical maximum number may be about twelve depending on the types of modules and the demand for power. The basic categories of modules may be a base module 11, I/O modules 15 and 16, and configurable safety modules. Base module 11 may be always the leftmost module on DIN rail 19. There may be just one module 11 on rail 19. All other module types may occur more than once. Base module 11 may provide power for the other modules, external communication (if any, it is not necessarily required) either via a 10BASE-T connector for ethernet-based protocols, and/or via a RS-485 3-wire connector for Modbus or BACnet/MSTP protocols), storage of data for device configuration and initialization, a real time clock and event logging, and a system control program.

Many of the modules may be passive. A primary active component in a system may be the control program in base module 11 which is typically responsible for making everything else "go". The modules may contain complex behaviors but they can wait for something outside of themselves to trigger the process of doing something useful.

An I/O module 15 or 16 may measure and condition its input signals, but it should to be told what to do and it does not necessary use the results. The module may provide them for some other module or external device to use. An I/O module may drive its outputs, but just if something else tells it what output signal to produce. A burner control 12 module may know how to start up and operate a burner, but just if something else requests this via a call-for-heat. A fuel-air control module 18 may modulate, but just if something else indicates a desired firing rate. A primary active component may be the control program which responds to stimuli and tells other modules what do by writing to the registers that control them.

I/O Modules 15 and 16 may provide inputs and outputs for use by the control program. Examples of I/O modules may include a 14-input digital I/O module 15 that also has 6 relay outputs, a 14-input digital annunciator I/O module that has 1 relay output, and an analog I/O module 16 that has up to 12 signal inputs and outputs.

The configurable safety modules in the present control system may incorporate a burner control 12, flame modules 13 and 14, fuel-air control 18 and actuators, and an analog limit control 17 (e.g., a temperature or pressure limit).

Safety modules cannot necessarily be programmed; just the base module 11 may provide this feature. The basic behavior of each safety module may be fixed but can be adapted to various purposes by changing configuration parameters. Burner control 12, for example, may have about 70 parameters to tune and select behaviors. Examples of the parameters may include timings such as prepurge, ignition, and postpurge times, a type of ignition such as pilot or direct, and the response to flame failure such as lockout, recycle, or recycle with a delay.

Inputs and outputs on a safety module may be available to the control program in base module 11 as readable items; however, these are not necessarily general purpose inputs and outputs like those on I/O modules 15 and 16. Instead, a safety module I/O may have a dedicated purpose. The inputs may be monitored and the outputs may be controlled only by the safety module itself, according to its rules for safe operation. A safety module may also have internal control parameters and status registers that are available to the control program. Each of these may also have a dedicated purpose. A few examples, for a burner control 12, may incorporate a parameter for a call for heat request (a non-safety signal which typically would come from the control program), status of the current burner state (e.g., standby, prepurge, ignition, firing and so forth), and a status: the elapsed time of the current state.

Flame modules 13 and 14, and fuel air actuators 18 may be noted. There may be a flame sensor module or modules for a burner control 12 and the actuators for a fuel-air control 18 belong to and may be operated by a "parent" safety module to implement some of its safety-related inputs and outputs. The flame modules 13 and 14 and actuators may be configured as part of the parent safety module's configuration. Flame modules may be mounted on a DIN rail 19 or can be mounted remotely on another DIN rail 22, such as to provide a flame amp module mounted close to its flame sensor.

Programmable logic control may be noted. A control program may reside and be executed within the base module 11. To create a control program, a designer may use a "wire sheet" editor within PC software called Niagara AX Workbench™. The programming may be performed by drag-and-dropping function blocks onto an editing screen, dragging lines between the blocks to interconnect them, and opening a block's properties dialog box to set up its behavior.

When a wire sheet input block is used, the designer may attach it either to the data from an input terminal of any module, or to a source of data from internal logic such as burner status information provided by a burner control 12. When a wire sheet output block is used, the designer may attach the block either to control an output terminal of an I/O Module, or to send data to the internal logic of another module such as the call for heat request for a burner control. Base module 11 may provide communication with a display, some other device, or a building management or industrial control system, or all of these simultaneously.

Blocks placed on the wire sheet may provide "points" within the device that are accessible via a connected external communication protocol. Thus, the control program may operate according to inputs from the outside world or provide outputs to the outside world.

Although the present system may be assembled from modules, when finished and installed on a particular piece of equipment, the modules may appear to be a single device that operates a piece of equipment. From an external protocol's viewpoint, virtually all of the points in the device may reside at a single address.

Figure 2:
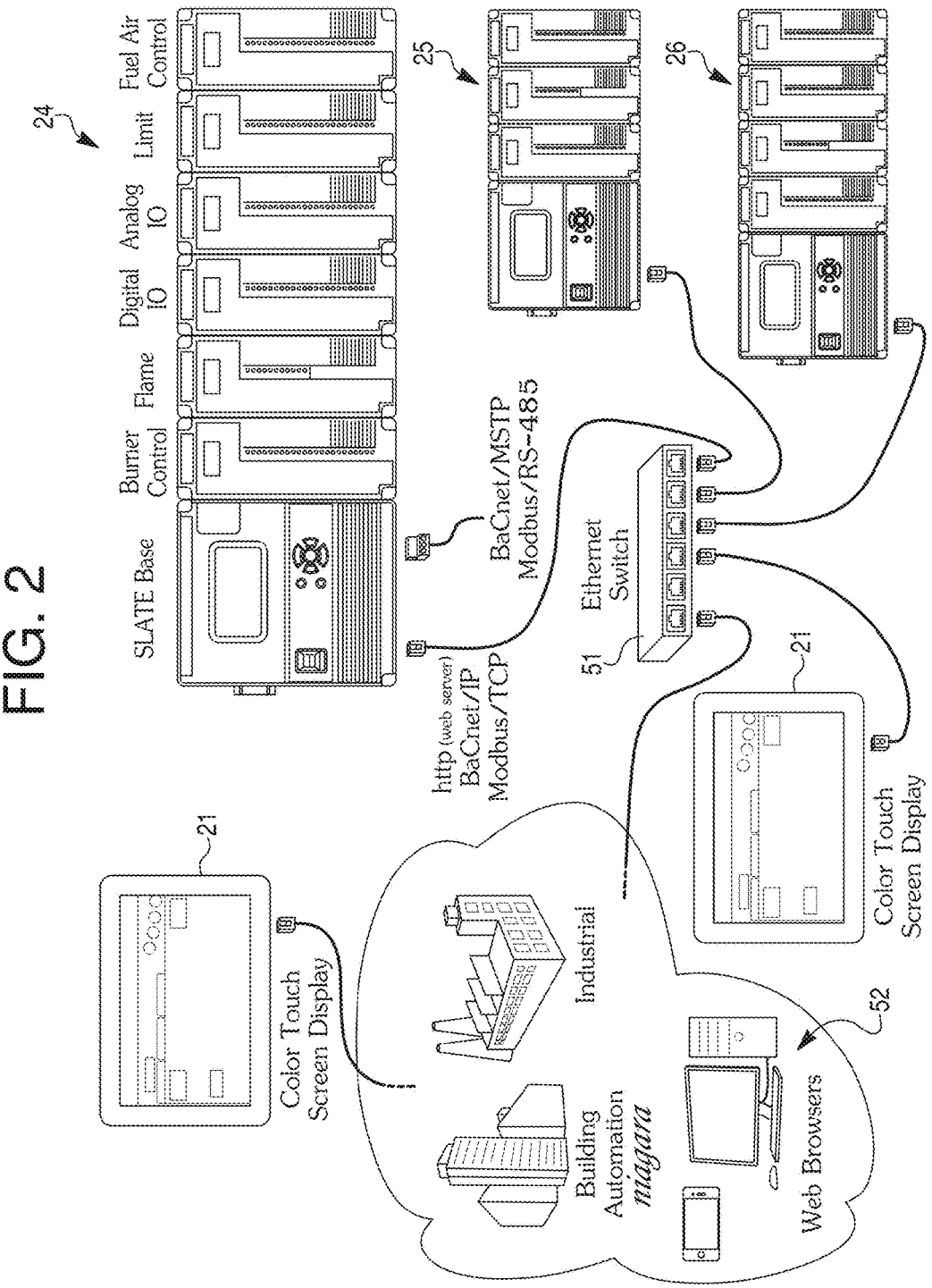
FIG. 2 is a diagram of several arrangements of devices for the present system.

Support may be provided for protocols such as BACnet/IP (via 802.3i 10BASE-T), BACnet/MSTP (via RS-485), Modbus RTU/IP (via 802.3i 10BASE-T), Modbus RTU/485 (via RS-485), and web browser access (httpd) (via 802.3i 10BASE-T). FIG. 2 is a diagram of several arrangements 24, 25 and 26 of devices for the present system.

The following may provide a summary of how Niagara AX™ and other tools may be used in the process of creating a new device for the present system. The system may use the Niagara AX™ software as a primary PC-based programming tool for an application designer. An important goal of the present system design may be to minimize the complexity of Niagara AX for a user who simply wants to create a control. The environment seen by the user may include just those AX™ features that are relevant to an issue the user wants to solve, such as creating a control for some equipment. For the user, the wire sheet editor used to program a system base may be the primary and only component of AX™ that is relevant.

The Niagara™ framework may provide a powerful set of tools for the system itself and the framework also may allow the system to be viewed as one of the elements within a much broader scope. A primary purpose of the Niagara framework may be to provide software and hardware tools to manage a rich and complex environment such as a building or a campus, or an industrial site containing many devices that use various communication protocols.

In the descriptions below, a user who is setting up a present system device for a particular purpose may be called an application designer or simply a designer. Typically, the designer may be an engineer who works for an OEM and is using the present system to create a control for some equipment manufactured by the OEM. The wire sheet program that the designer creates may be called a "control program" or sometimes just a "program".

Figure 3:
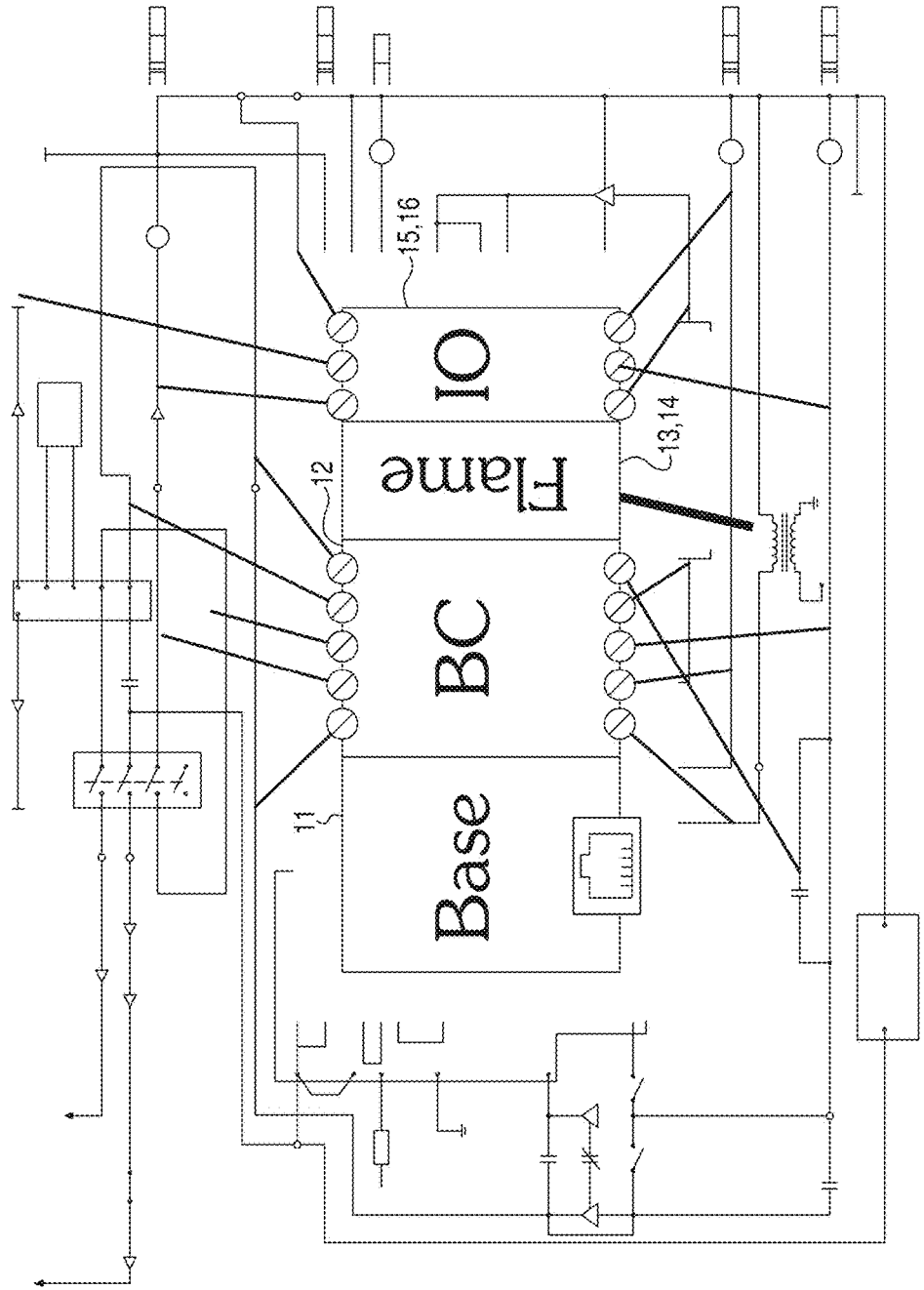
FIG. 3 is a diagram representing equipment with terminals and lines of modules based on the types of electrical devices that need to be monitored or controlled in the equipment.

FIG. 3 is a background schematic of equipment, screw terminals and lines indicating what a designer has chosen relative to modules 12-16 based on the types of electrical devices which need to be monitored or controlled in the equipment. For an actual design, the designer might use a schematic diagram, a list, or a form to record the choices.

Figure 4:
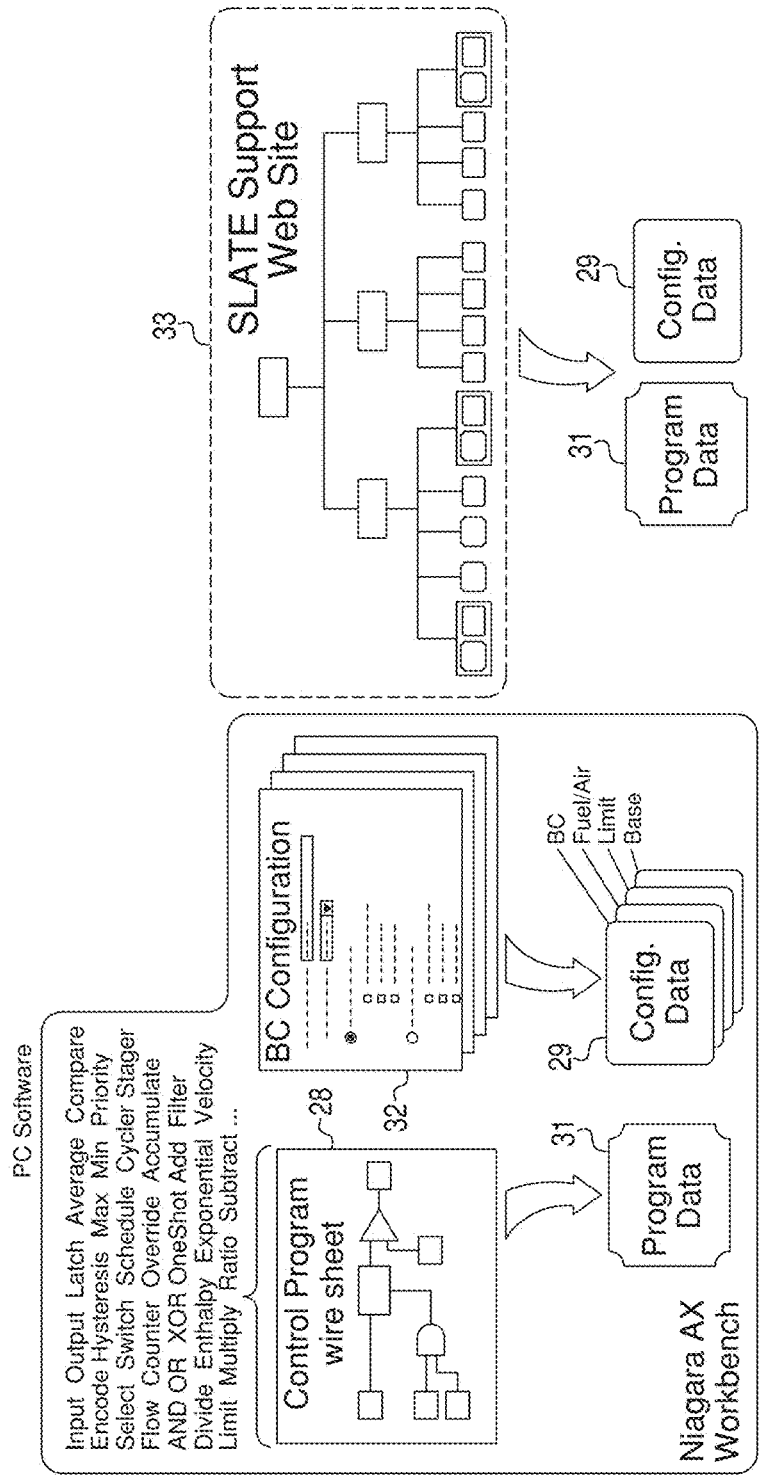
FIG. 4 is a diagram of a wire sheet program editing environment that may be used to create a control program for the equipment.

The Niagara AX™ wire sheet program editing environment may be used to create a control program for the equipment. Blocks representing inputs, outputs, and behavior, may be drag-and-dropped onto it and then interconnected by dragging "wires" (lines) between them. That step may be represented by control program wire sheet 28 on the left in FIG. 4 along with a list of some of the types of blocks that are available. Some of the types of blocks may incorporate input, output, latch, average, compare, subtract, encode, hysteresis, max, min, priority, select, switch, schedule, cycler, stager, flow, counter, override, accumulate, AND, OR, XOR, one shot, add, filter, divide, enthalpy, exponential, velocity, limit, multiply, ratio, and so forth.

Another task performed within Niagara AX™ may incorporate setting up configuration data 29 for non-programmable devices, such as burner control 12. The task may consist of a set of dialog boxes that present choices via drop-down lists, fill-in the blanks, checkboxes, and other techniques. The results may be one block of program data 31 that describe the control program and blocks of configuration data 29 for each of the safety modules, such as a burner control configuration 32 that contain the configuration settings. A support web site 33 may aid in obtaining the data.

Figure 5:
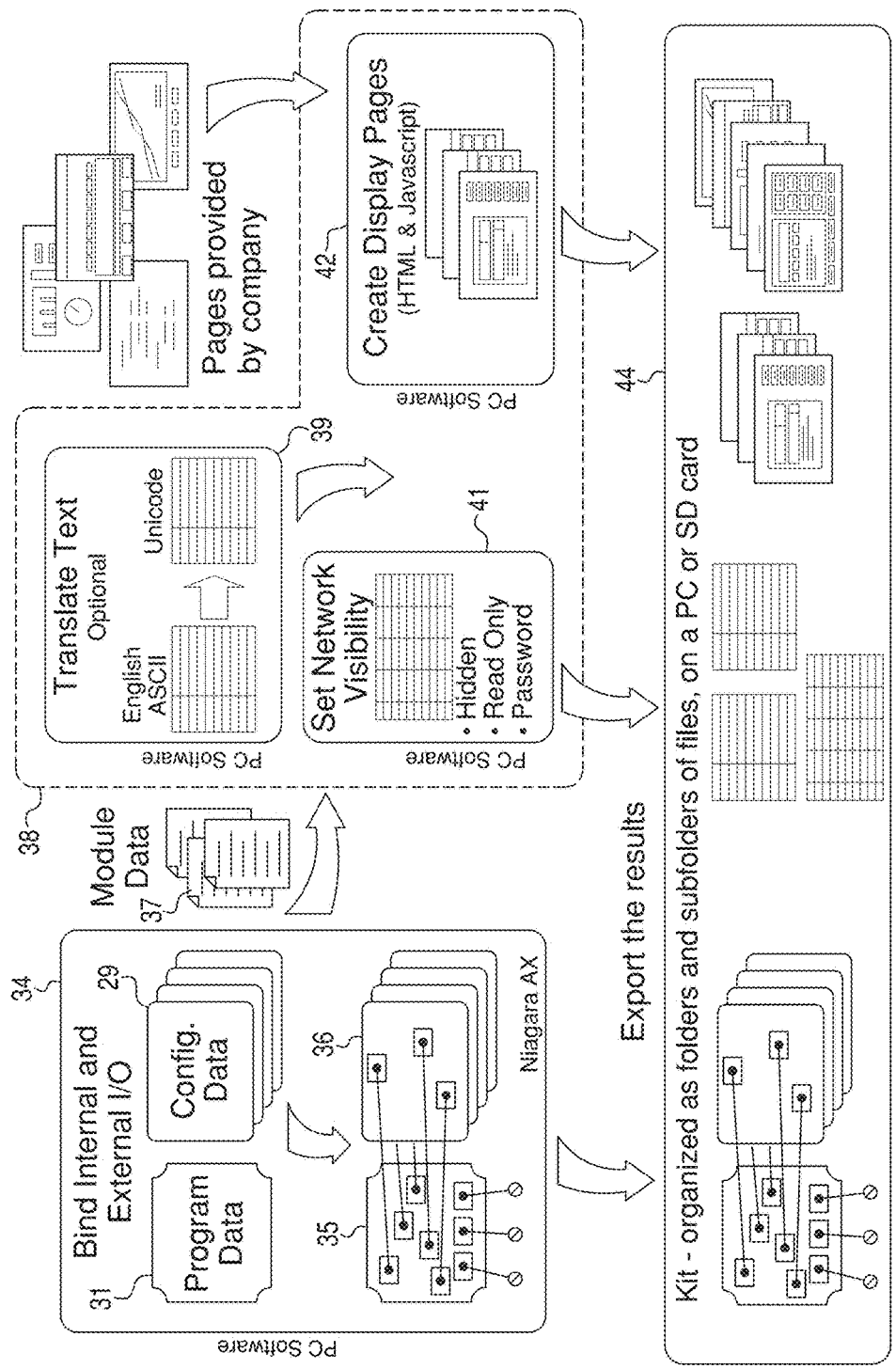
FIG. 5 is a diagram of activities that may be performed by a designer as part of developing an application for the present system.

Other design-related actions may be noted. FIG. 5 is a diagram of other activities that may be performed by an application designer as part of creating a device for the present application. Binding of block 34 may be the process of defining the actual screw terminals 35 or registers in the modules that are used by the program logic. Binding may be done within the wire sheet programming environment and may be done as-you-go, or as a separate step. Binding of terminals 35 may be to an I/O 36. An example of the binding may be a generic program downloaded from a web site, which is then modified for the present system, if needed, and then bound to the actual I/O needed by the equipment.

Module data may go from block 34 to a block 38 where text may be translated at symbol 39, network visibility is set at symbol 41 and display pages may be created at symbol 42. Pages may be provided by a company to symbol 42. Results from symbols 34 and 38 may go to symbol 44 where they can be organized as folders and subfolders of files on a PC or SD card.

The text used by modules to label and describe parameters and their values may be translated into some other language at symbol 38. When this is done, the standard English language text may still be preserved and available as an option, for use by personnel that prefer English.

Simply using any module may create many network-visible inputs and outputs in a device. An application designer may create others via wire sheet programming. The network inputs and outputs (or "points") may be filtered to make them hidden and remove them from visibility to the communication protocols. For example, of the hundreds of points that are available, a particular application designer may prefer to reveal only a dozen or so as items that represent the equipment and that are useful to the site where the equipment is installed. Also each point that is potentially writable may be set to a read-only condition, or a password to be applied, and/or range limits to be set. These choices may be made via a form that is available within Niagara AX, as part of creating a control program.

The display screens installed in a present system device may be web pages and the base may implement a web server to provide these pages to the display or any web browser, such as a browser in a PC or smart device. There may be a set of display screens for each of the modules that an application designer can use as-is, or adapt, or replace with a different design. The application designer may also create screens for the wire sheet programmable logic to represent the status of the controlled equipment.

All of the data created by the application designer may be exported along with mandatory data provided by a company, to create a present system "kit". The kit may be a single file, implemented as a .zip file, containing a folder structure with files in a specific form that is compatible with the present device. The name of a kit may be chosen to reflect a purpose of the design; for example, it might be named for a particular model of boiler, furnace, air handler, or whatever the design is intended to control.

A significant part of the present system may be the verification process for safety configuration data. Whenever safety data is changed for any reason, a safety device may enter a risks addressed (i.e., a shutdown) state until that change has been verified. Verification may consist of reviewing each data item without changing it and then, instead of sending a "read" or a "write" command to the module, a "verify" message may be sent.

A process of verification may incorporate pressing the "Select" button on the module, to confirm that the one being verified is the intended module within the intended device, because a display may be connected to different devices and a device may contain multiple safety modules. Verification may also need a password.

After an entire design is verified (all modules), it may be possible to save the verification status and load it with a kit so that an OEM does not have to re-verify the same design over again each time the design is replicated.

Typically, an operator in an OEM factory may load the kit into a device by assembling all of the required modules on the DIN rail, applying power to the system control; connecting a PC that is running a loader program to the base module's using a standard internet cable; selecting the desired kit from a drop-down menu (after the first time it will remain selected and this must be done only if the operator needs to change it), and clicking a button to send the kit to the system control.

The kit may be then loaded into the modules and when this succeeds, a "Pass" indication may be provided; or if it fails then the reason may be logged.

Figure 6:
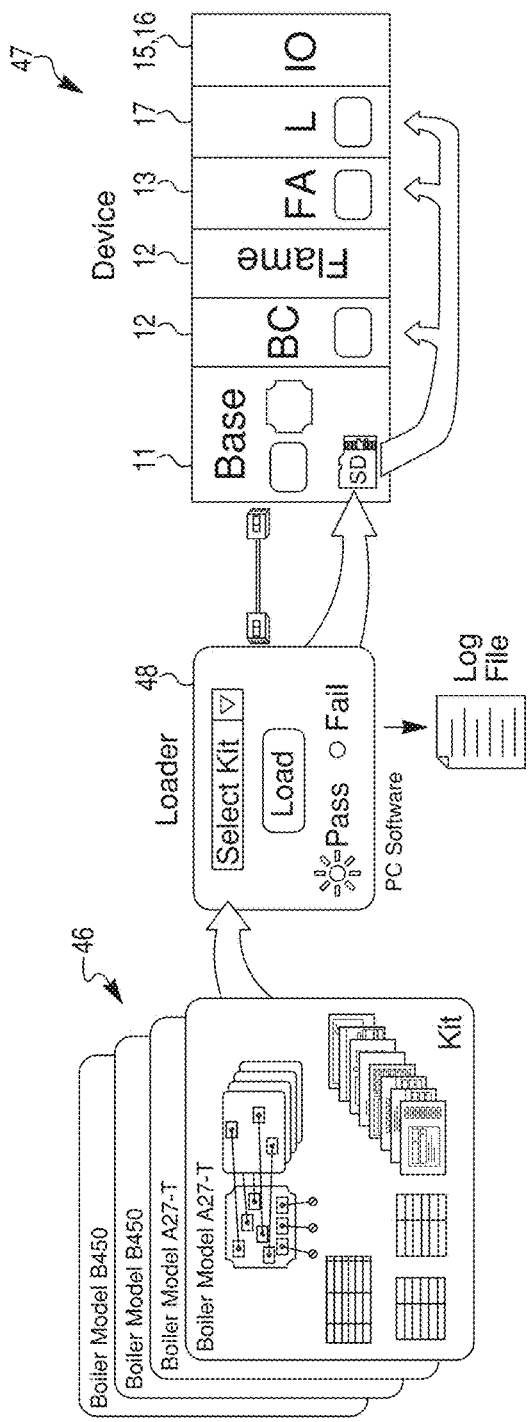
FIG. 6 is a diagram of a production line that may load one or more kits containing a design into an assembly of modules.

FIG. 6 is a diagram that illustrates a production line that may load one or more of several kits 46 of, for example, boiler models, containing a design into a match assembly of modules of a device 47. A kit 46 of a design may be provided by a loader 48 to device 47.

Another way to load a kit may be to install an SD card that already contains a kit, and copy the information into the modules from there. The step may also occur as part of loading via a Loader program. A primary activity performed by the Loader may be to copy the kit onto the SD card. The SD card may provide a backup of module configuration data, storage for trend logs, and the device's display pages that are shown by the web server.

A display 21 and device 24 may have a single RJ-45 jack for ethernet communication. They may be connected to each other via standard ethernet cables such as Cat-5e with RJ-45 connectors on both ends. (FIG. 1.)

A crossover cable is not necessarily needed because the display adapts automatically, thus an inexpensive standard cable may be used. For cables with RJ-45 ends already attached, a 3 foot cable suitable for connecting a device to a panel-mounted display on the panel door may be used. Longer cables up to 100 feet with RJ-45 ends already attached may be used.

FIG. 2 is a diagram that shows how multiple devices and/or displays may be interconnected in any combination using a router or a standard ethernet switch 51. Various connections of devices may be effected via a router. The core of a display 21 may be a standard web browser and a device may be a standard web server. Thus, a display may also be connected to a device from any point in the cloud that has visibility to the device. Rules that apply to servers and browsers 52 connected via the Internet may also apply to devices with an exception. Neither display 21 nor device 24 may run a virtual private network (VPN) protocol. Thus, display 21 may be used just within the same private LAN that contains the device. A private LAN may be assumed, in that placing a device directly on the public internet is not necessarily recommended; although the device may have network security features. The device should be within the security boundary of a private network.

A PC, a smart phone, or pad may also access a device via a web browser. The device may serve its display web pages to those items just as easily as it does to the display itself. The present system's web server may be designed to support, for example, a Chrome™ browser.

Although the display and devices do not necessarily implement VPN, a virtual private network that is implemented by routers at both ends which "tunnel" through the public internet may allow a remote system display to connect. Otherwise, a PC may be used as a display and it can run VPN protocols to access a private LAN from virtually anywhere on the Internet. Some smart devices may also support VPN.

Like a web browser, the display may be set up to have a "home page" on a particular device or any other network location that is visible to it. The display may also support bookmarks (favorites) for quick access to previously saved locations, such as a set of different devices.

A display may incorporate one capability not necessarily present in a PC or smart device. The display may poll for local devices. When invoked (this approach may be its start-up default), the display may poll the local subnet and list any devices that it finds, showing them as a list of names with IP addresses. Each item in the list may be a link, and touching one of those may open that device's top level web page.

The display screens provided by the present device may be implemented as a web site, that is, as a set of web pages, can be stored within the device. There may be a set of standard pages that an application designer can modify as desired or use as a starting point for new pages. Also new pages may be created from scratch.

Since the display may be a standard web browser and the device may be standard web server; many appearances, features, and behaviors that one sees when visiting Internet web sites may be available for displays of the present system.

Any web site design tool may be used to create web pages; however, for the present system to make the task easier, the development environment may provide a web page editor that has special features specifically for the present system. The editor may know how to load in the design information for a device that allows it to offer pop-up lists that let a page designer easily connect web page components (widgets) to data of the present system.

The device web page editor may provide palettes of icons called "widgets" that are drag-and-dropped into a design rectangle that represents a display area. Each type of widget may have a particular way of displaying itself. Text widgets may allow text to be displayed or entered. Button widgets may be clicked or touched to activate them. Graphical widgets may animate a spinning fan or a flickering fire or water flowing. The editor may be used to create pages for the display. However, the editor also may be used for various screen sizes such as to create display pages for a PC-sized screen.

The web page editor may support several kinds of "containers", pages, panes, and tabs. Each of these containers may be set up with different backgrounds and can contain widgets. One may be the web page itself, but within that page there also may be one or more panes and one or more tabs. Panes may be rectangular areas that surround other widgets to make it easy to move them as a group, or copy an entire group. Tabs may be like panes, except that there are many areas in the same place, and a tab can be clicked/touched to show that tab's contents and hide the contents of other tabs. A widget within a container may have its own connection to a particular data item within a device, or it may "inherit" part of its connection from its container.

A primary present system distinctive feature of the editor may be that it can read the output files produced for a particular application design and then use this information to make it easy to connect display widgets to present system data for display screens of the application.

For example, a numerical read-out widget (a text box) and a graphical widget (e.g., a variable sized flame or a growing/shrinking bar) may be desired to show the flame strength in the burner control. Providing the widget via the design tool may consist of dragging the widget's icons from the palette into a desired location in the design area (or clicking the widget to select it if it is already there), and then for each of them, selecting "Burner Control" via a modules pop-up list, and then selecting "Flame strength" via a registers pop-up list that shows the registers in the selected module.

For another example, a touch-screen button may be desired to show the on/off status of some application-designed logic and to toggle that state when it is clicked/touched. An application designer may have created a wire sheet input named "App Enable". Providing status and control for this via the display editor may consist of dragging a button widget from the palette into the design area (or clicking the widget to select it if it is already there), then selecting "Wire Sheet" via the modules pop-up list, and then selecting "App Enable", a name that the designer provided via the registers' pop-up list that shows the registers defined by the wire sheet.

The editor may be able to automatically generate an appropriate JavaScript™ that is "behind" a widget to cause it to fetch/send/use system or device data when that widget is displayed. The data linkage between the JavaScript running in the browser (e.g., the present system or device display) and the system web server running in the system base may be via standard http protocol URLs. When the page is saved as an .htm file, the JavaScript and the URLs used for data input/output may be within the saved page as text. Thus, in addition to documentation, one may create examples that show what the editor is generating to interact with the server in the system base module.

A display may be a standard web browser. The display may display device pages or any pages provided by a web server to which it can connect in its network. Display behavior may be any behavior that can be expressed in the JavaScript programming language. Display appearance may be any representation supported by HTML5 and HTML5 Canvas (e.g., a Chrome browser). The data available to the display may be virtually all of the configuration, control and status data built into modules as well as data inputs and outputs created by an application designer via the wire sheet program. Any of the various free or professional web page design tools may be used to create displays, but the present system display design tool may have some added convenience. Amateur or professional web site designers may create displays for the present system. Amateur or professional graphics designers may create backgrounds, buttons, icons, logos, animated graphics, and so forth, for the display of the present system.

Modular flame amplifier system with remote sensing may be noted. A flame amplifier or flame amp may be a name for a circuit used in combustion flame sensing, that operates the electronics of a flame sensor and converts a signal provided by the flame sensor into a proportional flame strength signal that is sent to a combustion controller.

In some controls, the flame amp may be integrated into the same enclosure and circuit board as the combustion control, or it may be a plug-in module that attaches to the combustion control. The plug-in module may provide flexibility in that an appropriate flame amplifier may be used to match virtually any sensor type, without requiring the controller to change. Flame sensing technologies that use different flame amps may incorporate a rectification in which a flame signal is indicated by a tiny difference in the positive versus a negative conduction of an AC signal, ultraviolet light in which the pulse rate of a vacuum tube changes if the light of a flame impinges upon it, and optical sensors which measure the visible or infrared light and sometimes detect a flickering as an indication of flame.

Several issues may arise with flame amps. One issue may be noise. Flame amps may require that the flame sensor wiring be long to bring a signal from the sensor which is near the burner, to the flame amp which is in or on the combustion control that is mounted in a panel, at some distance away from the burner. The arrangement of long distance may make the signal susceptible to noise and degradation.

Another issue may be a limited configuration. Flame amps may be mated to or integrated into a control. Some controls may provide for two flame amplifiers and two flame sensing technologies, either by integrating these items into the control or providing two plug-in devices; but this approach may be rare and, in any case, the possible flame amp configurations may be limited by the design of the control.

An issue may occur with relay switching. For combustion systems such as "bed" burners, where the gas burner is large and spread over an area, it may be necessary to use multiple flame detectors. At start-up, one detector (and a flame amp) may be used to detect that the flame has initially been established at one end of the bed, and other detectors and flame amps may need to later prove that the flame has reached the far end of the bed. In some systems, external relay switching may be used to swap different flame detectors into the control's single flame signal input and this external relay may add to cost, increase the chance of component failure (more components and moving parts) and it should be evaluated for safety impact if the relay fails.

Another issue may be power and component cost. For flame sensing via an ultraviolet vacuum tube, a shutter solenoid device may be used to interrupt the light to the sensor, for sensor testing. The shutter may add to the cost and require extra power.

The present system and approach may allow multiple flame amplifiers to be connected to a combustion control via a multi-drop communication bus that is designed to be noise tolerant and use a safe and secure communication protocol.

Noise tolerance improvement may be attained. If convenient, a flame amplifier 13, 14 may be mounted in a normal location, adjacent to combustion control 12 in the control panel (FIG. 1) and in this case it may support ordinary wiring that brings the sensor signal all the way to the control panel. However, as an alternative, an installer may choose to mount a flame amplifier 13, 14, remotely near the flame sensor, so that a noise-susceptible sensor signal that uses wiring which is short and direct and more noise-immune wiring between the flame amp and the control may carry the signal over the greater distance.

Multiple flame amps may be supported. Because a multi-drop bus is used, multiple flame amps may be connected as easily as one flame amp, using just one set of connectors on the control. This approach may allow virtually any number of flame sensors to be used for both redundancy and flexibility. For a bed burner, the present system may easily accommodate a detector at each end or at several locations across the bed, and for reliability and/or increased safety, multiple sensors can be used at each location.

Installation flexibility may be noted. The design of the connectors and a physical form of controller module 11 for the present control and flame amps may allow an installer to choose either an adjacent or remote location of flame amps 13, 14, with no changes to the design or setup of the control. The choice may be "invisible" to the control and thus the installer can be free to choose whatever is best. Additionally, if the flame amp is adjacent to the control, a cable to connect the flame amp to the control is not necessarily required.

Ease of installation may be noted. The present design may also allow multiple controls and flame amps to co-exist on the same DIN (Deutsches Institut für Normung) rail 19 mounting without confusion about which flame amp belongs to which control, and with automatic correct wiring. This may be implemented by a connector design and a rule that all flame amps belonging to a control need to be immediately to control's right on DIN rail 19.

Reduced cost/power may be achieved. A shutter system for a UV tube detector may be potentially more expensive and require more power than a dual UV flame detector with no shutter. Because multiple flame amps and sensors may be easily supported, the cost and power demands of a shutter can be eliminated.

Configuration flexibility may be noted. The present burner control may provide multiple "recipes" for flame amp configurations. This may allow an application designer to easily choose an appropriate application. Examples may incorporate a single sensor for detection of a flame, a dual sensor with an OR configuration (redundant in that if either is on then there is flame), dual sensor with an AND configuration (better safety in that both must be on to prove a flame), a single sensor plus delayed sensor (a bed burner in that a first sensor must be on immediately, second sensor is in after a delay), a dual sensor plus a delayed OR configuration (a dual OR sensor but with each sensor having a backup for redundancy), and a dual sensor plus a delayed AND configuration (a dual AND sensor but with but each sensor being duplicated for better safety).

The configurations may be independent from the actual sensor type, which is virtually any recipe that can be used with the same types of sensors and amps, or with any mixture of sensor types. Multi-burner systems may often use a (fixed) design in which each burner is monitored by both a rectification and a UV sensor.

The present flame amps may provide electronics and connections for multiple flame sensors within a single flame amp module. The flexibility may be software-configured using safety-rated software techniques and communication protocols.

The present system 24 may provide flexible and configurable recipes for flame sensors. Support for more than two sensors per control may be good for the present system. System 24 may have flame amps 13, 14 mounted remotely from the control via cables 54 and 55, respectively. (FIG. 1.)

An equipment designer using the present system may choose the positions where flame sensors will be used and determine how many different sensors to use. The equipment designer or installer may select flame amplifiers that are compatible with the chosen flame sensors, and use safety-rated software to configure the control system.

Module auto addressing in a platform bus may be noted. Modules in the system may be interconnected together with a common platform communication bus to interact with one another. Unique module addresses may be necessary to ensure that modules communicate correctly. Modules may be physically connected in any order on the platform bus and the number and types of modules can vary by installation. Fixed addressing for each module is not necessarily possible for a plug-and-play installation. Module address assignment may be performed dynamically at run-time to ensure unique addressing for all modules. Modules may be physically located in any order and be functionally able to communicate on the platform bus.

Auto addressing may be automatically invoked when system is powered up and can be manually invoked anytime thereafter. Results of auto addressing may be evident at the master module.

Figure 7:
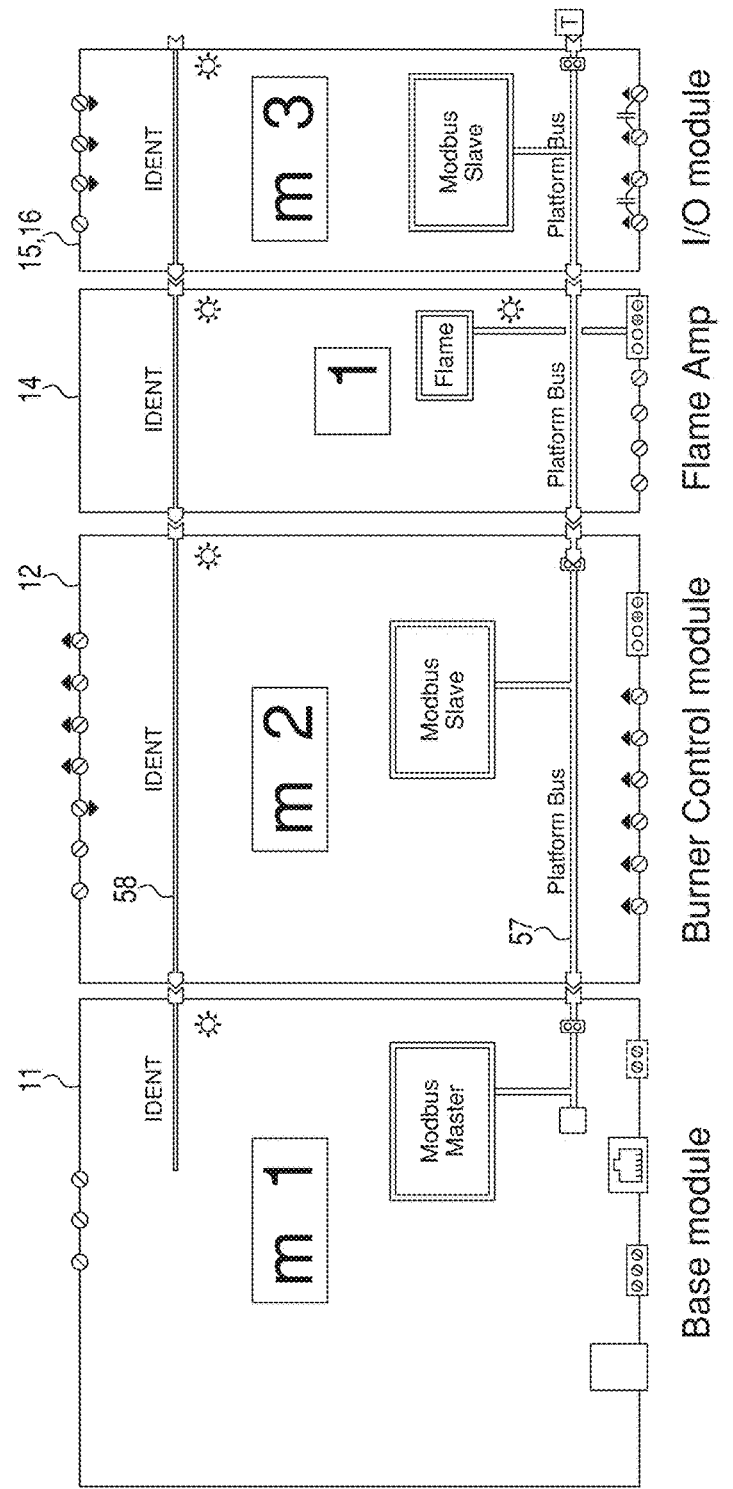
FIG. 7 is a diagram of a platform bus with auto addressing using identification signal line.

Platform bus MS/TP auto addressing using IDENT signal line may be noted in FIG. 7. The present algorithm may dynamically assign device MAC addresses to modules on a platform bus 57 at run-time. Platform bus 57 may use a BACnet MS/TP LAN data link protocol for inter-module communication. The algorithm may be automatically performed at a base module boot-time and upon a command later on when directed to do so. Until the algorithm is executed, the modules designated as slaves on the platform bus (all modules other than the base module) do not necessarily assume any device address (i.e., an address initialized to broadcast address), and therefore, do not necessarily respond to any MS/TP messages directed to a specific address.

Modules on platform bus 57 may be connected in a manner as FIG. 7 depicts. Base module 11 may be the only MS/TP master on the bus, and the other modules 61 may be MS/TP slaves. Platform bus 57 may be an RS-485 two-wire network with voltage differential signal lines, data+ and data−. The bus may be terminated at both ends with 120Ω resistors (one in the base module and one in the last module on the bus). Terminating resistors are not necessary for a bus with a short length. The resistors are mentioned in case they may be needed. Platform bus 57 may run through sub-base connectors interlocking modules 61 together on a DIN rail 19. FIG. 8 is a diagram of MS/TP addressing by DIN rail 19 position.

FIG. 9 is a diagram of a configuration layout of the various modules or devices and their components relating to the present system.

Figure 9A:
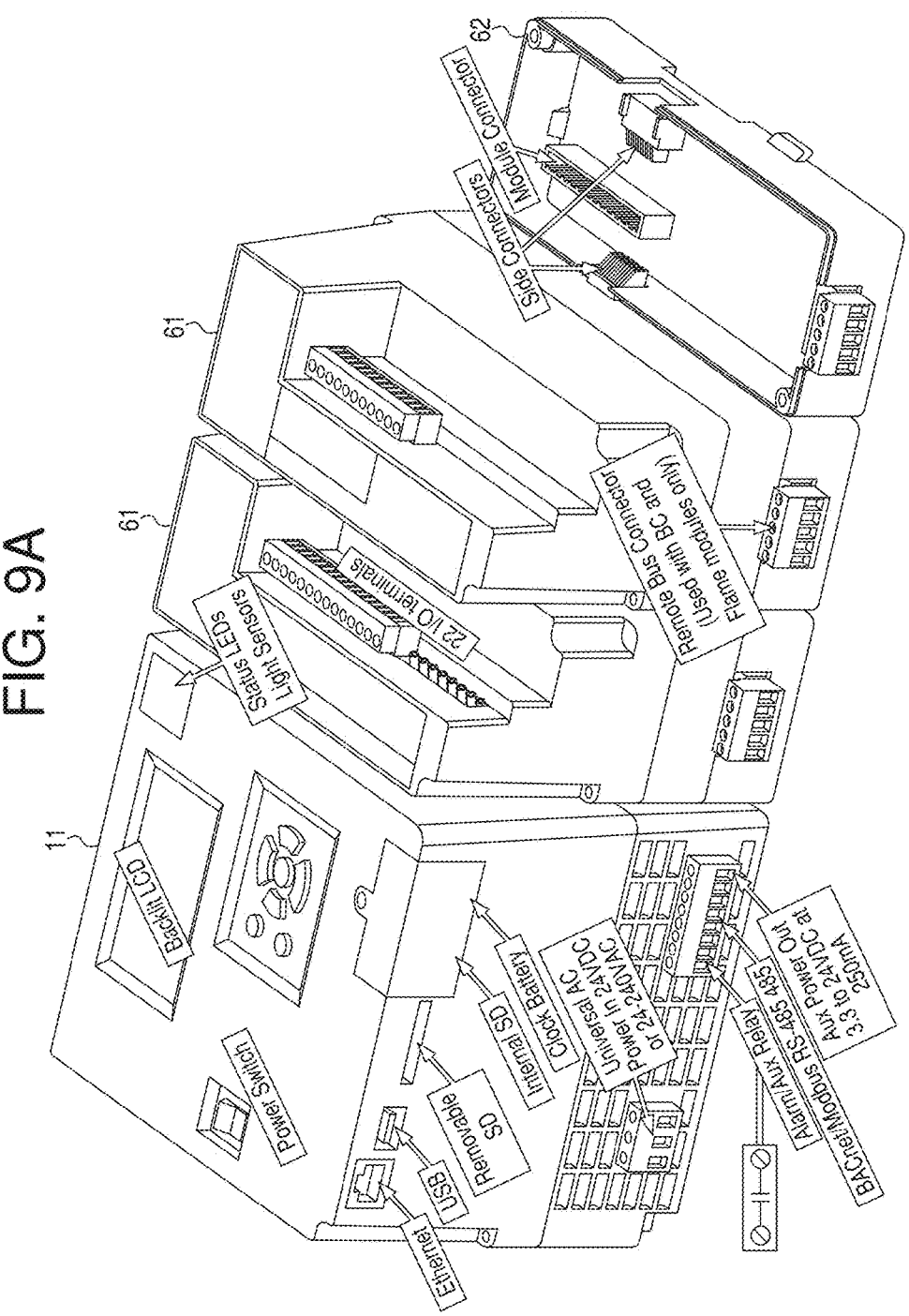
FIG. 9a is a perspective diagram of a base module and slave modules.
Figure 9B:
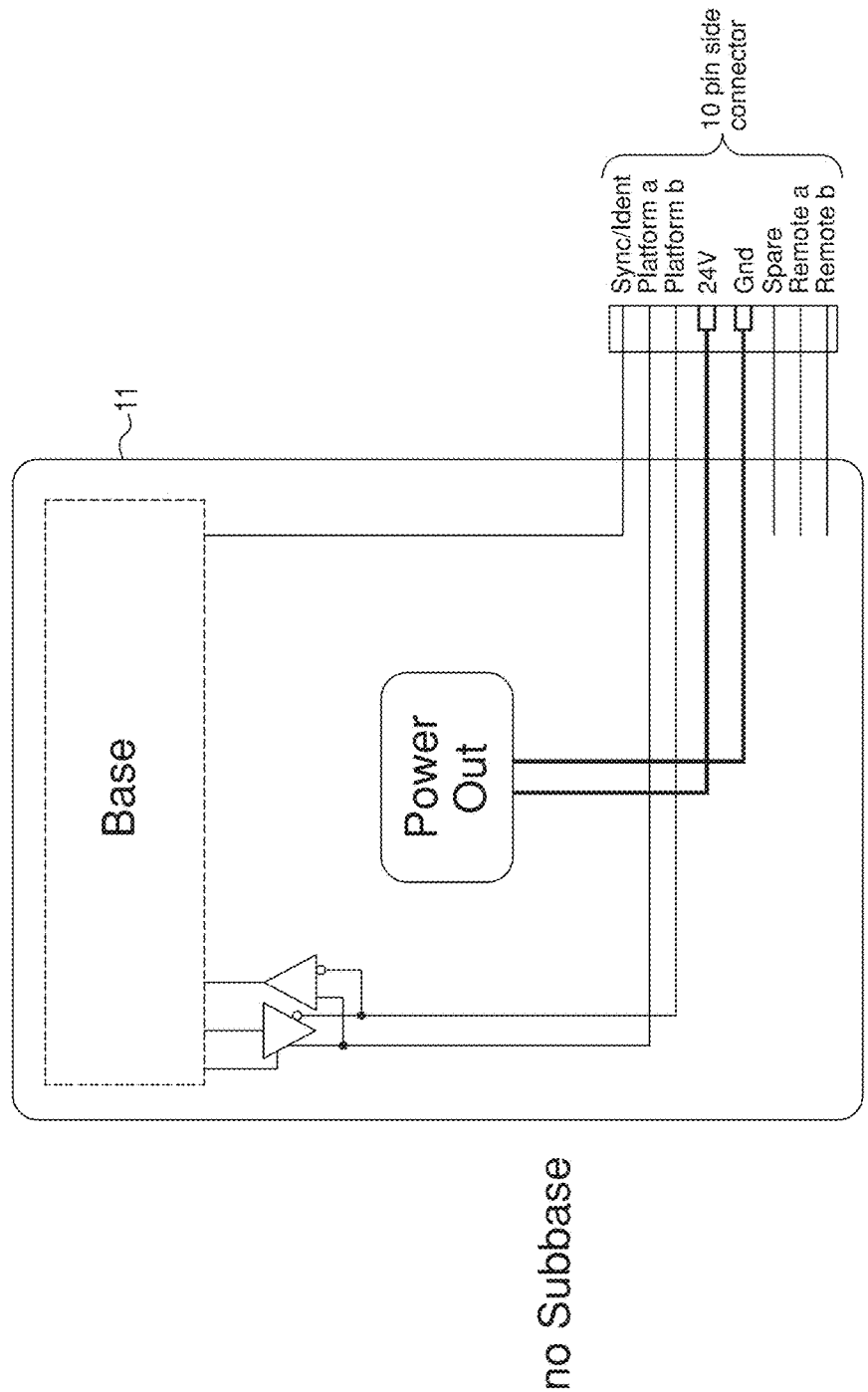
Figure 9C:
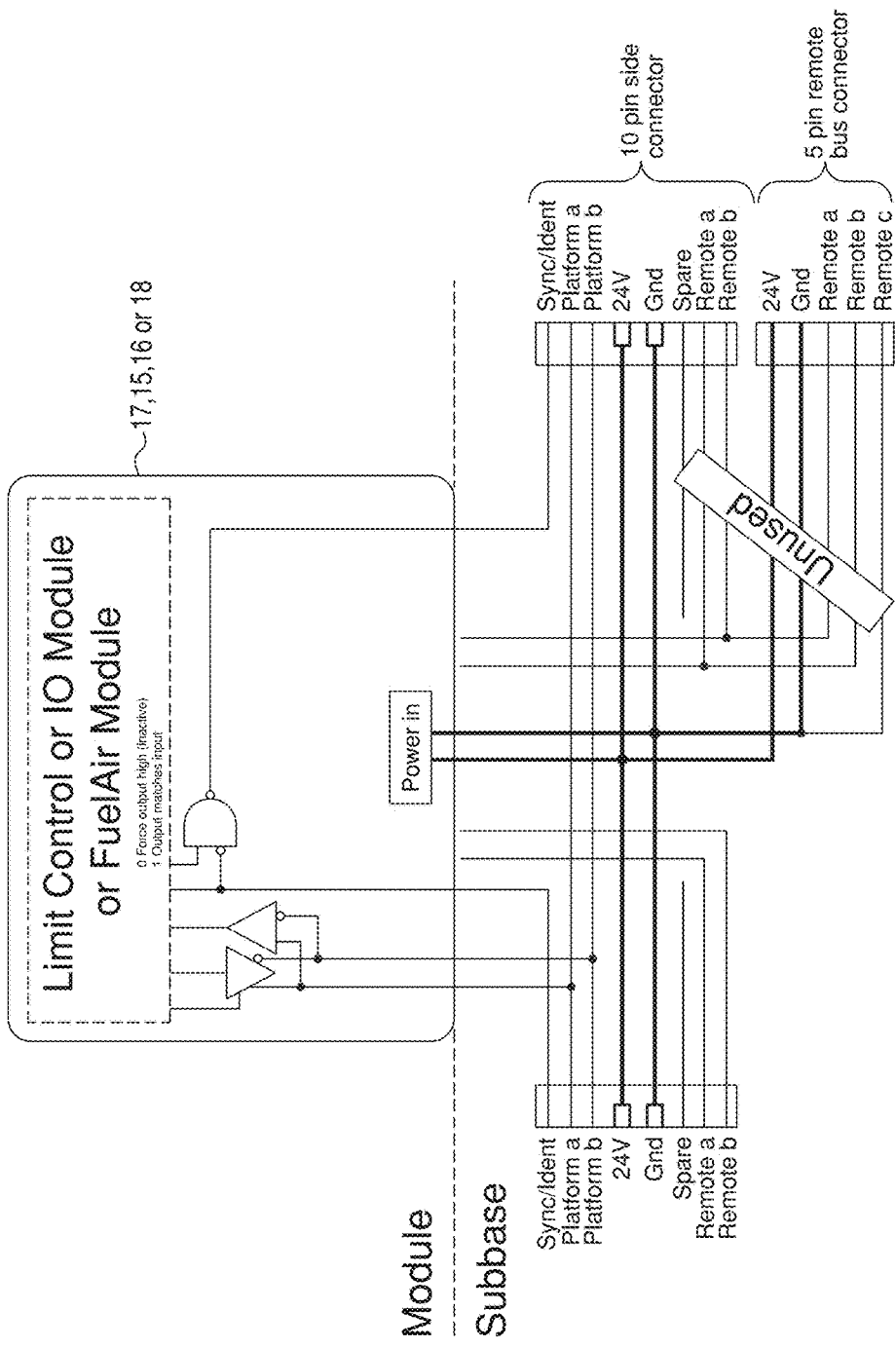
Figure 9E:
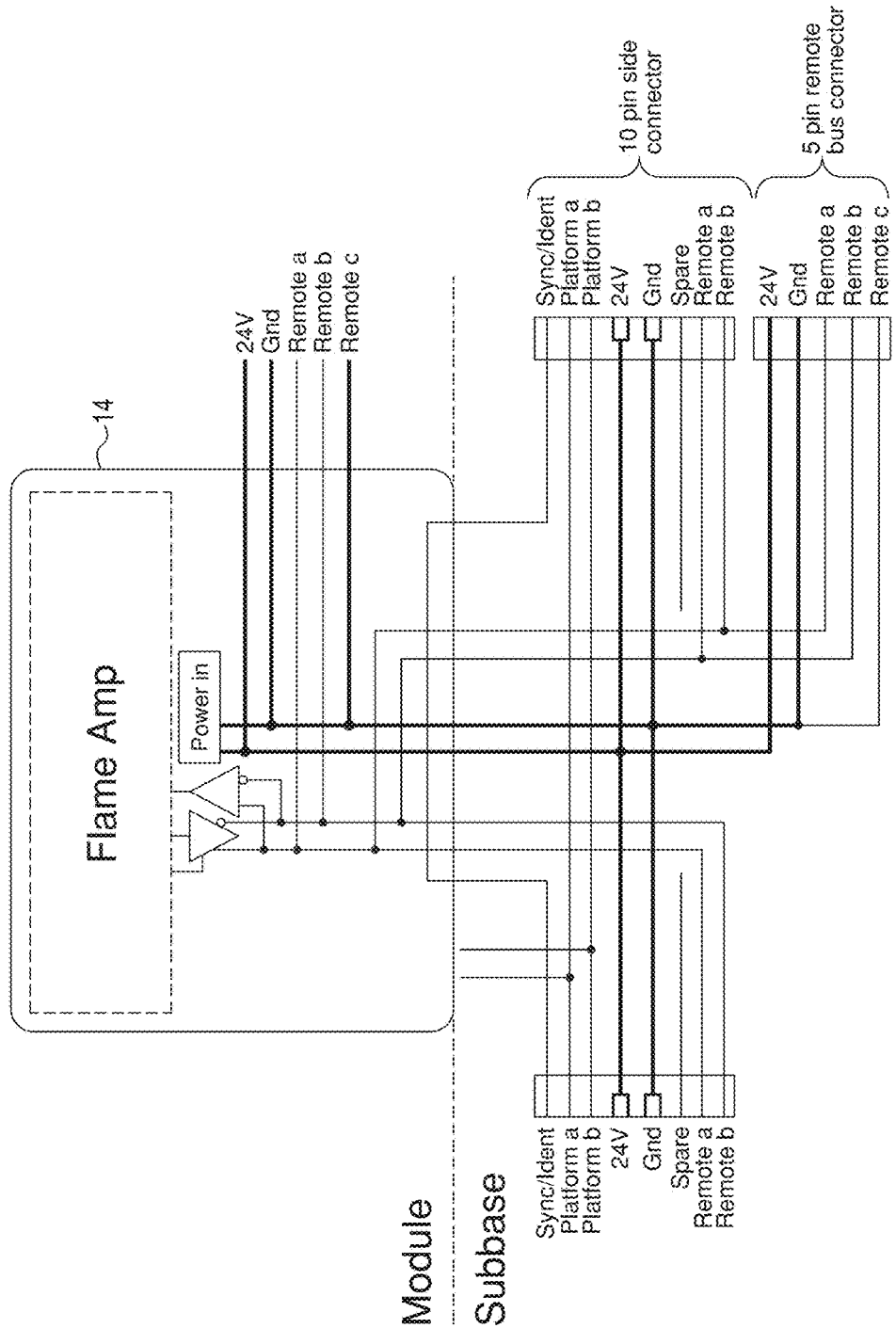

A component used in the algorithm may be an IDENT signal line 58 that can also run through each module via sub-base connectors. The IDENT signal may normally be run directly through each module 61 via hardware so that the input side of the module is automatically routed through the module to the output side. The output IDENT signal may be overridden, however, by software inside the module to control the signal presented to the adjoining module. FIG. 9*a* is a perspective diagram of base module 11 and slave modules 61. Item 62 may be an example of a sub-base for modules 61. FIGS. 9*b*, 9*c*, 9*d* and 9*e* indicate connections among base module 11, limit control module 17, IO modules 15 and 16, fuel air module 18, burner control 12 and flame amp 14. These connections are representative of an example hook-up.

Auto addressing may be noted. In the algorithm, base module 11 may assume device address 1 even though it is not technically a slave device 61 on bus 57. The assumption may be more for user interface purposes to give a user a perception that addresses are assigned to virtually all modules starting with the address of one. Also, the device address may be used when the module 11 provides its own data onto platform bus 57. The addresses may be allocated and assigned to each module based on their physical position on DIN rail 19. Addresses may be assigned in numerical order from left to right by their DIN rail position.

Base module 11 may have an address 1 by default. A module 61 adjoining the base module 11 on its right side may be the first module to get an address assigned (i.e., address 2). A module to the right of the second module may be next to get its address assigned (address 3), and an assignment may proceed to the right until all modules 61 have an assigned address.

Modules that do not necessarily participate on platform bus 57, but may occupy space on DIN rail 19, e.g., flame amplifier module 14, are not necessarily assigned an MS/TP address for platform bus 57. Platform bus 57 may simply pass through these modules onto the next adjoining module 61 eligible for an address.

Auto addressing may begin by base module 11 putting all modules 61 into an auto addressing mode. Base module 11 may cause an entry of this mode by broadcasting a proprietary frame message on the platform bus with an "AUTO Address" frame type code. After all modules 61 have been allocated an MS/TP device address, base module 11 may direct virtually all modules 61 to leave this mode by broadcasting a proprietary frame message with an "AUTO Address End" frame type code.

Virtually all platform bus communication in this algorithm may use proprietary frame messages to ensure that the special messages are not necessarily confused with normal traffic data and also since no specific frame types exist that match the intentions of them. The proprietary frame types that may be used in the algorithm can incorporate 128 (0x80)—AUTO address start, 129 (0x81)—AUTO address end, 130 (0x82)—OFFER address, 131 (0x83)—ASSIGN address request, 132 (0x84)—CONFIRM address assignment, and 133 (0x85)—ACKnowledge address confirmation.

Since these messages are not necessarily standard MS/TP frames, they may have an assigned a vendor identification code (e.g., value 17) as the first octet in the data portion of the frame. The format of these proprietary frames may be given in an MS/TP message format.

IDENT signal line 58 may be used in the algorithm to signal when a module has its address assigned and may be permissible for the next adjoining module to have an address assigned to it. Once a module has an address assigned, the module may drive the IDENT output high continuously until auto addressing is complete for all modules. When Auto addressing mode is finished, the IDENT output may be returned back to the low state.

Each module on the platform bus may employ an idle timer to look for an idle bus. The idle timer may be a count-down timer (i.e., it starts at a specific value and counts down to zero to denote timer expiry) and may be used for several purposes by each module during the algorithm:

A line timeout may detect when an end of a transmitted packet on the bus has finished (normal purpose for all of MS/TP communication). A sequence delay may be a delay between sequences in the algorithm where a minimum of 1 ms of no bus activity exists between each packet transmitted on the bus for this algorithm. Response timeout may occur when the base module waits up to 40 ms for an expected response from a slave module. Auto address timeout of 100 ms may occur when no MS/TP activity occurs on the bus that denotes the end of auto addressing mode, and therefore, the modules may exit this mode and resume normal activity on the bus.

By default, after a MS/TP packet is received by a module (whether it is directed to the module or not), the idle timer may be reset to the auto address timeout value unless the module is directly involved in the next sequence of the algorithm.

Auto addressing may proceed according to the following approach. First, a base module drive IDENT output may be low. Second, a base module may broadcast an AUTO address message and wait for 30 ms following transmission. In an AUTO address message, a list of all known addresses from a previous auto addressing procedure may be included. Base module 11 may set the next available address to 2 since the address of 1 is taken by the base module. Third, virtually all modules 61 may see the AUTO Address broadcast and enter an Auto addressing mode (Address pending state). Each module 61 may drive its IDENT output low and scan the known address list in the broadcast to see if its current address is in the list. If the address is in the list, then the module may set an ADR to this address, otherwise the ADR may be initialized to 255. An ADR may be a variable that each module uses to store its assigned address. Modules 61 may wait up to an auto address timeout for the next command.

Fourth, when the base module's idle timer expires (e.g., 30 ms), the module may broadcast another AUTO address message again and drive its IDENT output high. The module may wait about 20 ms following the transmission. Fifth, any module that missed the first auto address broadcast may enter an auto addressing mode (address unassigned state) and drive the IDENT output low. The modules may reset their idle timer to the auto address timeout value.

Sixth, the module 61 immediately to the right of base module 11 may see that the IDENT input is high now (transition from low to high) and know that it is the selected module to get an assigned address. The module may enter the address selected state and wait up to an auto address timeout for base module 11 to offer it an address.

Seventh, when the base module's idle timer expires (e.g., 20 ms), the module may broadcast an OFFER address message with the next available device address in it. Also included in the message may be a current list of addresses that have been assigned so far. A first OFFER address message may just include the base module address, but the list can grow as each module 61 is assigned an address. After the broadcast is sent, base module 11 may enter the waiting slave address state to wait for a slave response.

Eighth, when the selected module on DIN rail 19 sees the OFFER address broadcast and the IDENT input is still high, it may know that the offer is directed to it. Module 61 may compare the address list and see if its current address is contained in it. If the slave module's current address is not in the list, the current address may be reused or the next available address from the OFFER message may be used. The selected address may be placed into the ADR and an ASSIGN address request containing this address may be broadcast. Also included in the ASSIGN request may be the module type and serial number of the module. The module may enter the address assignment state and wait up to an auto address timeout for an address confirmation. Values for the module types are not necessarily given. The module type may be irrelevant, but is included since base module 11 may need to know this information for other purposes.

Ninth, virtually all other assigned slave modules 61 may ignore the messaging going on between base module 11 and targeted slave module 61. They may reset their idle timers to the auto address timeout value after each complete message is received and wait for the process to complete.

Tenth, when base module 11 sees the module's ASSIGN address request, it may add module 61 to its module list and enter the address confirmation state. Base module 11 may send a CONFIRM address message back to the module 61. The new message may contain the device address, module type, and serial number sent in the broadcast and serve to confirm the address assignment in the module. Base module 11 may wait for a response from the selected module 61. Eleventh, if the base module does not see any response to its OFFER address broadcast (response timeout), it may assume that the addressing is complete. Base module 11 may enter the Address assigned state and go to a fifteenth step of the present approach.

Twelfth, slave module 61 in the Address assignment state may see the CONFIRM address message and send an ACK response message back to base module 11 with its module type, serial number, and OS number in it. After the response has been completely sent, the module may let the IDENT input signal pass through it onto the next module on DIN rail 19. The confirmed module may enter the address assigned state, set its idle timer to the auto address timeout value, and wait with the rest of the assigned modules. All further MS/TP communication by module 61 may use the assigned device address.

Thirteenth, when a next module 61 on DIN rail 19 sees the IDENT input signal transition from low to high, the next module may know that it is now the selected module for the next new address. The module may enter the address selected state and wait up to auto address timeout for base module 11 to offer the module 61 an address.

When base module 11 sees an ACK response, it may reset its idle timer and go to the seventh step of the present approach to find the next slave module 61 located on DIN rail 19.

Fifteenth, when there are no more slave modules waiting for an address assignment, base module 11 may broadcast an AUTO Address End message onto platform bus 57 to notify all slave modules 61 to exit Auto addressing mode. Included in this broadcast message may be the total number of address assignments that occurred. Base module 11 may enter the addresses assigned state and exit auto addressing mode.

Sixteenth, when virtually all of the slave modules 61 see the AUTO Address End broadcast, they may discontinue driving the IDENT output signal (i.e., they let the hardware automatically handle it), and exit the auto addressing mode.

Figure 10A:
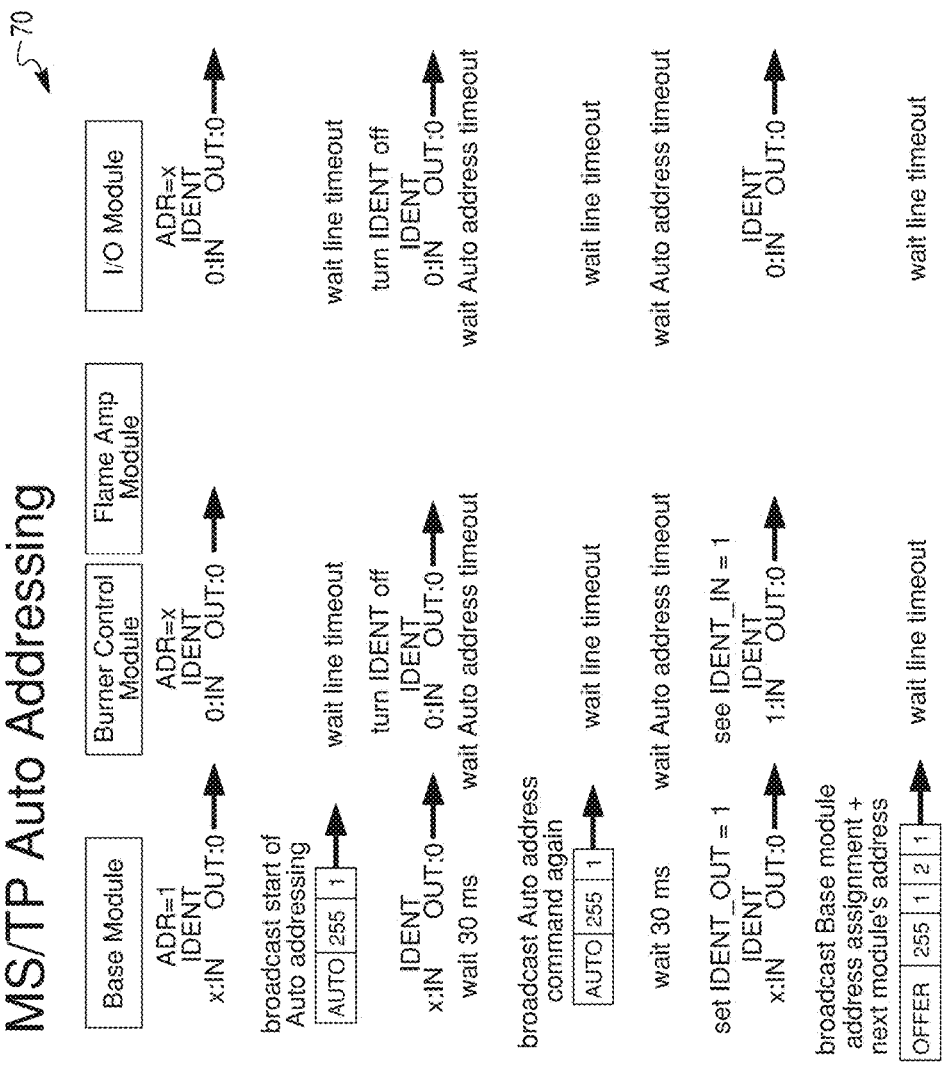
FIGS. 10a, 10b and 10c constitute a diagram depicting an operation flow of auto addressing for the present system.
Figure 10B:
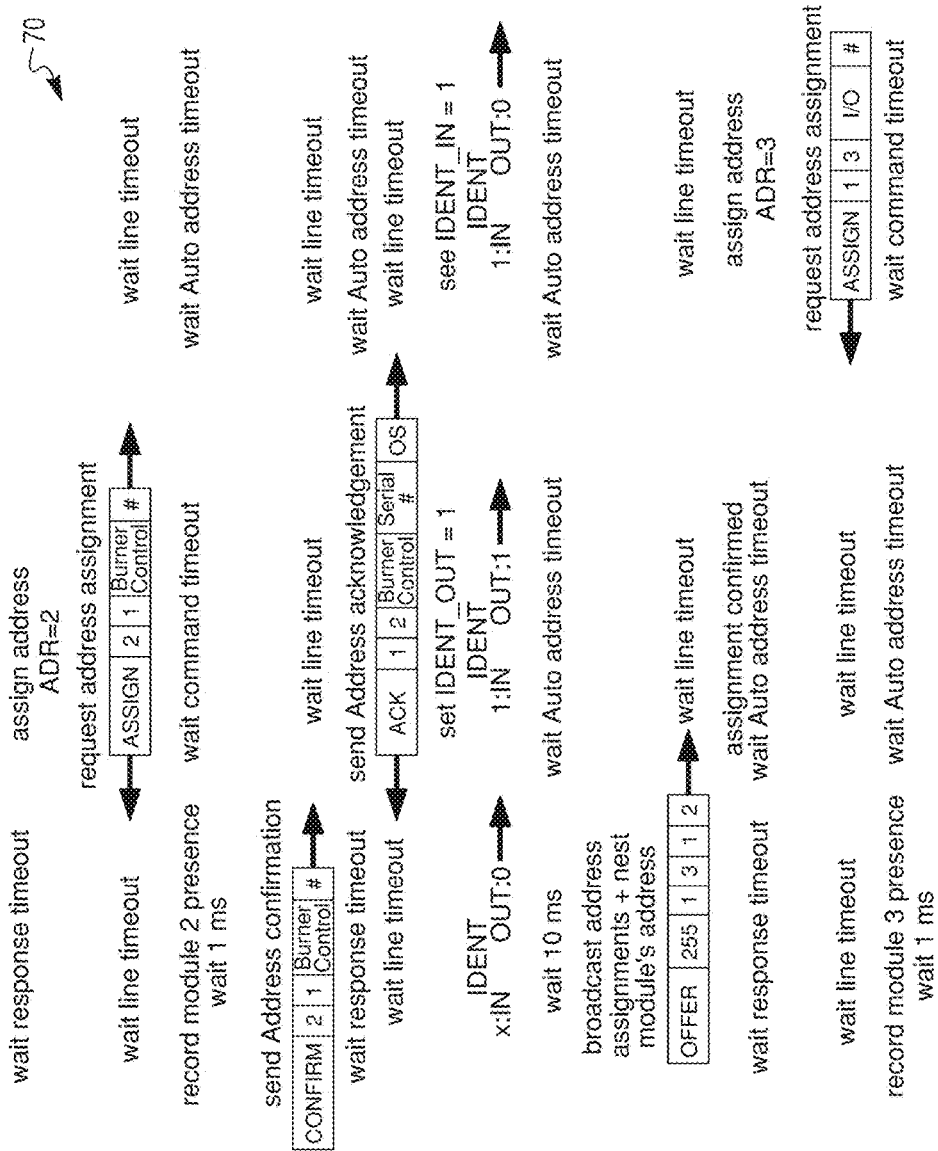
Figure 10C:
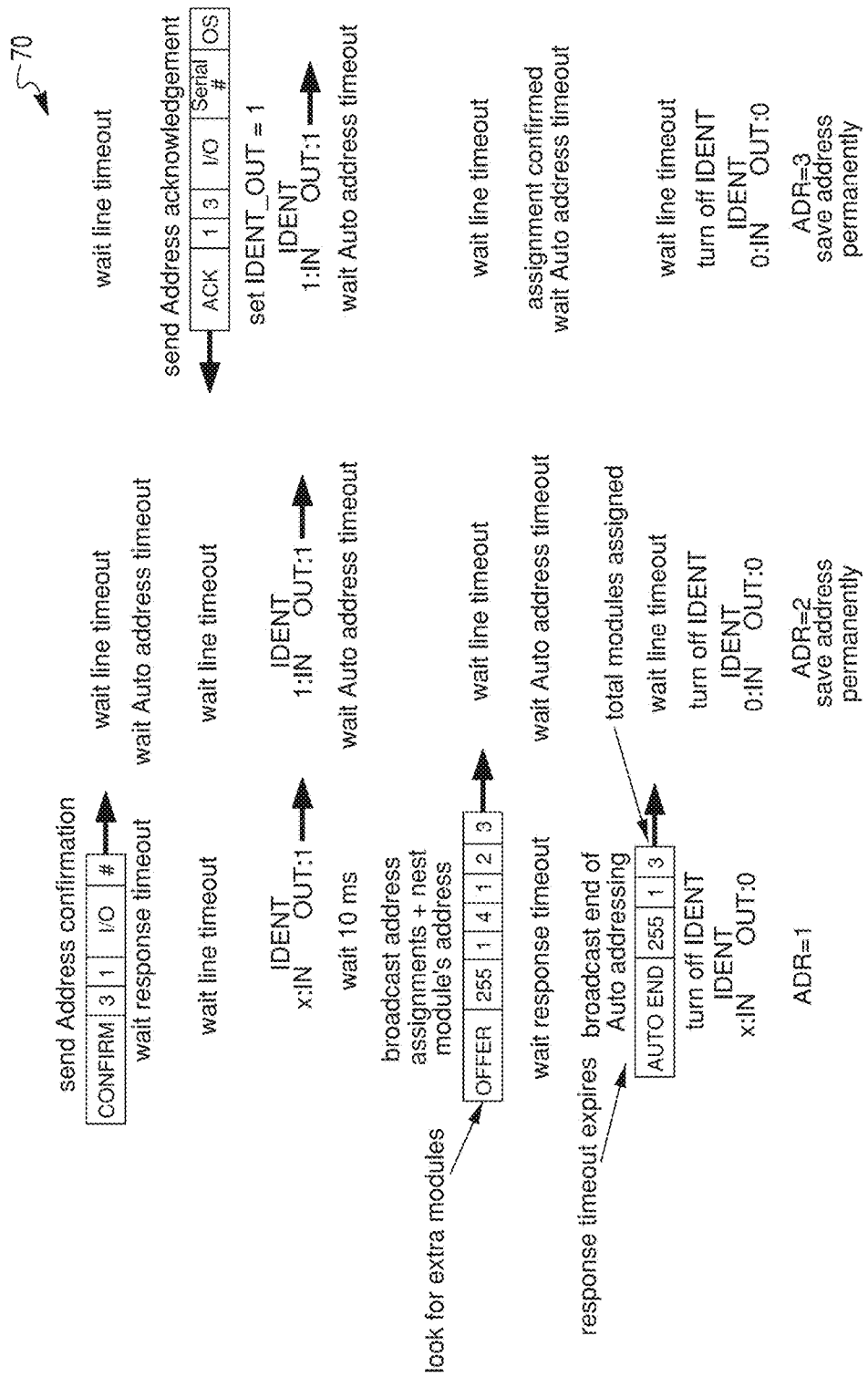

After the approach or algorithm is finished, virtually all modules 61 that participated in it may have an MS/TP device address assigned to them, and the existence of the modules with their addresses may be in base module 11. Any modules that missed out may remain in an Address unassigned state and will not necessarily participate on platform bus 57. The FIGS. 10*a*, 10*b* and 10*c* constitute a diagram depicting the operation flow of the present approach of MS/TP auto addressing.

Any missing or unexpected modules found during the present auto addressing approach (as determined by system design) may be noted by base module 11 and the necessary response may be performed.

Figure 11:
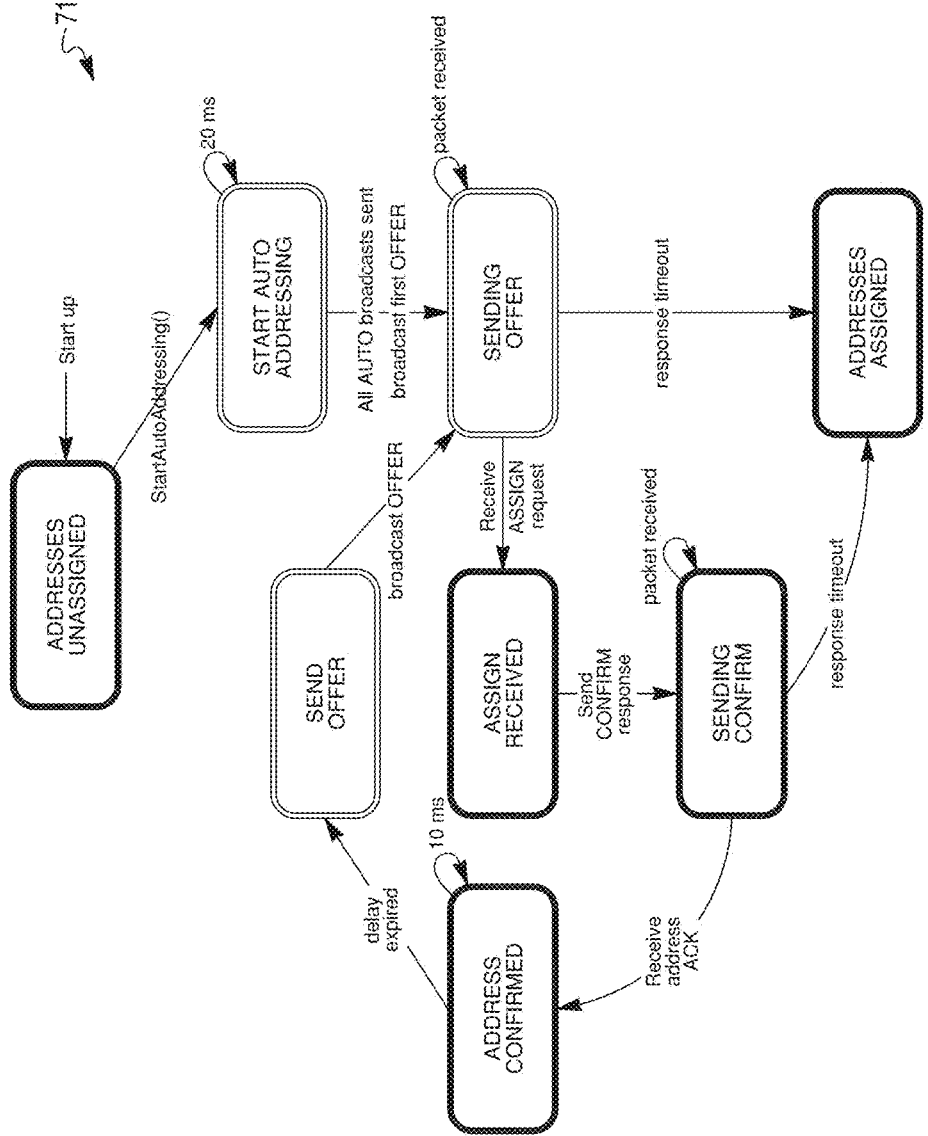
FIG. 11 is a diagram showing a master state machine for the platform bus master.

A master state machine may be noted. The present approach may have the following states for the platform bus master (base module). The states may incorporate ADDRESSES_UNASSIGNED, START_AUTO_ADDRESSING, SEND_OFFER, SENDING_OFFER, ASSIGN_RECEIVED, SENDING_CONFIRM, ADDRESS_CONFIRMED, and ADDRESSES_ASSIGNED. There may be more or less states. FIG. 11 is a diagram 71 showing a master state machine for the platform bus master.

Figure 12:
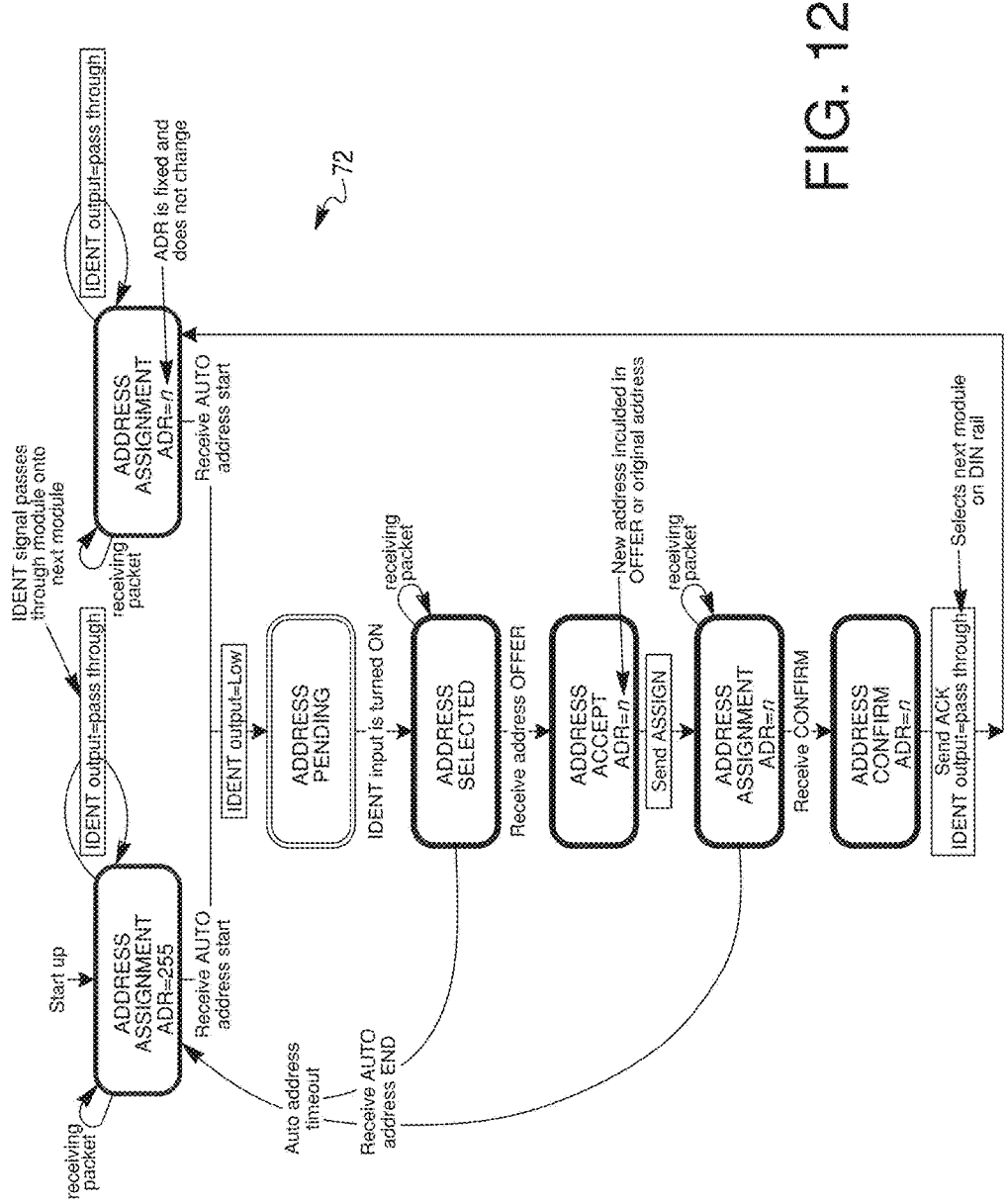
FIG. 12 is a diagram showing a state machine for slave modules on a platform bus.

A slave state machine may be noted. The present approach may have the following states for the platform bus slaves (non-base module). The states may incorporate ADDRESS_UNASSIGNED, ADDRESS_PENDING, ADDRESS_SELECTED, ADDRESS_ACCEPT, ADDRESS_ASSIGNMENT, ADDRESS_CONFIRM, and ADDRESS_ASSIGNED. FIG. 12 is a diagram 72 showing a state machine for the slave modules on the platform bus.

The MS/TP message format may be noted. The structure of the MS/TP messages used in the auto addressing algorithm is shown in FIGS. 13-18. An AUTO Address may be a message used to start Auto addressing mode in all modules on the platform bus. FIG. 13 is a table 74 showing an AUTO Address message data structure.

An AUTO Address End may be a message that signals when Auto addressing mode should be exited. FIG. 14 is a table 75 showing an AUTO Address end message data structure.

An OFFER Address may be a message used by the base module to offer an available device address ("Next address") to a slave module. FIG. 15 is a table 76 showing an OFFER Address message data structure. The OFFER Address message may have a variable length since the number of slave modules that have been assigned an address varies. The "Assigned address" field may be provided for each module that has been assigned a device address and as a group may be called the assigned address list. The "Total assigned" field value may determine the number of module instances in this list, and therefore, derive the total size of this message.

An ASSIGN Address Request message may be used by a slave module to request a device address. FIG. 16 is a table 77 of an ASSIGN Address request message data structure. A Source address may be the address being requested and normally be the address offered by the base module in the OFFER address message. An Address CONFIRM message may be used by the base module to confirm the device address assigned to a slave module. FIG. 17 is a table 78 of a CONFIRM Address message data structure. An Address ACKnowledgement message may be used by a slave module to acknowledge the device address that it has been assigned. FIG. 18 is a table 79 of an Address acknowledgement message data structure.

Safety and programmable logic integration may be noted. In some systems, used to control equipment that needs safety devices and programmable logic, stand-alone safety controls may be integrated with the programmable logic in two ways. One example of a safety control may be a burner control; one example of programmable logic may be a programmable logic control (PLC), which can be a common term used to identify a particular type of programmable logic. The PLC typically, but not necessarily, may perform non-safety functions. One approach may be to connect wires from the safety device's inputs and outputs to PLC inputs and outputs so that the PLC can both monitor what the safety device is doing and also request the safety device to perform certain actions (such as issuing a call-for-heat to a burner control to request it to light the burner). Another approach, which might or might not be used in combination with the first, may incorporate implementing a communication protocol so that the PLC can "talk to" the safety device. The approach may often require a protocol converter or adapter as an external electrical device, unless the PLC and the safety device both speak the same protocol. In either approach, special programming of the PLC may be needed to "teach" it how to interpret and use the safety device's electrical or communication data. Thus for either case, a considerable amount of customizing work, often requiring both hardware and software, may be needed to allow the programmable device to know whatever it needs to know to perform its control function.

The present system may provide transparent and seamless integration of a programmable logic module (with expansion input/output (I/O) modules that are used to operate equipment) and safety devices incorporating a burner control 12, a fuel air control 18, a flame module 14, and/or a limit control 17. (FIG. 1.) The system may consist of safety, programmable logic, and I/O modules 15 and 16 that are designed to mount on DIN rail 19 and interconnect via side-by-side connectors, and also to talk to each other, via a common communication protocol carried by the wires in these connectors. From the end-users' perspective, the protocol and connections appear invisible.

Programmable logic may include an ability to control input and output electrical terminals that are part of the PLC and that are connected to actuators and sensors in the controlled equipment. In the present system, a feature is that virtually of the safety device internal status data and the safety device inputs and outputs may be modeled and appear in the same context as the PLC's own inputs and outputs. Thus, the status and control, and I/O data may be "attached" to the programmable logic's software routines without any need for electrical interfaces, protocol adapters, or custom programming to interpret the information. No special effort or customization is required. Virtually all of the dozens or hundreds of information items in a safety device may easily and transparently be available for programmable logic use.

A designer of programmable logic to operate equipment (such as an air handler, boiler, or furnace) may select the safety modules needed by that equipment and also the I/O modules 15 and 16 to connect the programmable logic to that equipment. Another module called base module 11 may always be present in the system; module 11 contains the power supply for the system, communication to the outside world, and the programmable logic. The designer then may use a typical programming environment to develop the control logic. For the system, the environment may be a high level "wire sheet" logic block editor: where logic blocks are drag-dropped from a palette onto a design sheet on a computer screen and these can be interconnected by dragging lines between the blocks. Wherever the control logic needs inputs or outputs, the designer may use the editor to specify a connection between the logic and the I/O by using conventions provided by the logic editor; e.g., by opening a properties dialog box for a logical input or output block, and selecting an I/O device or terminal by name, via a pop-up list. In the present system, the pop-up list may incorporate not only the typical PLC I/O module inputs and outputs, but also the inputs, outputs, and internal registers of the safety devices.

Combustion control with a programmable display may be noted. A combustion control system such as a burner control or fuel-air control may include a display that is designed to operate the control. Some customers may request the manufacturer to modify the display in small ways such as changing the name of something to match their preference; removing a feature that, for that customer, is unused; or adding a feature; or moving a feature to a different screen; or providing a customized logo. Other customers may want to completely differentiate their version of the product by making the display uniquely theirs in layout, color scheme, content, graphics used, and so on, so that it does not look anything like a competitor's display even though the competitor is using the same control and electromechanical components. Moreover, modern modular controls may include programmable behavior that is designed or heavily customized by a customer; therefore, the display for those behaviors cannot necessarily be anticipated by the combustion and display equipment manufacturer but instead should be designed by the customer who is also creating the programmable behavior.

The combustion control system may represent a status of its dedicated purpose devices as a set of defined data items, called "registers" here. A customer who creates programmable behavior logic may also create other registers to provide the data generated by that logic. These registers may then be served (i.e., provided to the display) by using a standard interface. One example of a standard interface may be the HTTP protocol used by a web server, which can receive requests for data from a client and provide responses to the client. On the display side, an example of a display driver that uses this interface may be a web browser, and an example of a display design tool may be a web page development tool for creating web pages.

By using a page design program, the designer of the special programmable logic (on the control that provides the web server) may create a display for that logic on the display (that implements a web client). The display may consist of pages, tabs, touch-screen buttons, graphics, text, animations, and similar display objects. These may be controlled as to their content or appearance or behavior by data from the programmable logic device. Similarly touch-screen buttons on the display may send altered values to registers to operate the control system.

To attach a display object to specific data that it uses (e.g., data that animates it, or provides a value to be displayed, or receives a value that is set), the designer may just specify a register that provides appropriate data.

Thus, a designer may use the display design tool and a register mechanism to independently create a specialized user interface, avoiding perhaps any need to pass this request to develop this on to the equipment manufacturer. This may be used for a range of display adaptation needs, from slight modifications of existing display screens perhaps initially provided by the manufacturer, up to a complete redesign of the display for differentiation.

When the design is complete, data representing that design may be stored into the control such that any display that is compatible might use this information to represent the design; that is, the design may reside and stay with the control for which it was created.

Because the equipment display may use a standard client mechanism (such as a web browser) that exists on multiple kinds of hardware, and because the display design is implemented and stored in the control (in the server), the display screens are compatible with many physical devices such as a display specifically designed for the equipment, a smart phone, a tablet, or a PC.

Additionally, for a device such as a PC which can provide multiple client windows, multiple simultaneous live views (pages) of the controller status and operation may be easily available, each in its own window.

Display design tools are common and as indicated, a standard web page design tool is an example. The difference versus related art may be in 1) the application of this technology to a combustion control system, 2) the use of registers that are built-in for pre-designed functions and/or added for customer-designed functions as a way to easily bind the display objects to the data, 3) the storage of the display data in the control rather than in the display, 4) the flexibility of having the display run anywhere, and/or 5) the ease of obtaining multiple views of the control.

The customer may purchase the appropriate control and a display that has not been specially programmed. The customer may then use techniques provided by the control to set it up and create custom logic for it. The customer may still then use a display design tool along with knowledge of the registers in the control to either create a display with any degree of customization, from minor adjustments to completely different from all others. When the design is complete, it may be loaded into the control, such as via a factory-based loader program.

To recap, a module addressing mechanism may incorporate a platform bus, a base module on the platform bus, and one or more modules besides the base module on the platform bus. The base module may be designated as a master on the platform bus. The one or more modules besides the base model may be designated as slaves on the platform bus. The modules might not necessarily assume a device address when put on the platform bus. The modules may be dynamically assigned addresses by an algorithm at boot time of the base module.

The platform bus may run through sub-base connectors of the modules interlocked together on a structure.

The platform bus may be connected to the modules situated in a series with the series beginning with the base module.

The mechanism may further incorporate an identification signal line that runs through each module. The identification signal line at an input side of the module may be routed through the module to an output side. A signal on the identification signal line may be controlled by the module that is presented at the output side to an adjoining module.

The base module may have a first address by default according to the algorithm. Addresses may be allocated and assigned to each module according to their position relative to one another. A first module that is a slave next to the base module may be assigned a second address. If a module is a slave next to the first module, the second module may be assigned a third address. An assignment of a subsequent address to a module that is a slave next to a module previously assigned an address may continue sequentially until each of virtually all modules that are slaves on the platform bus is assigned an address.

If a module does not participate on the platform bus but is situated adjacent to a module that is a slave on the platform bus, the platform bus may pass through the module onto a next adjoining module.

The base module may put virtually all of the modules that are slaves into an addressing mode result in the assignment of addresses to the modules. After each of virtually all modules that are slaves on the platform bus has an assigned address, the base module may direct all of the modules to leave the address mode with a message to the platform bus.

Platform bus communication may use proprietary frame messages. The proprietary frame messages may incorporate one or more messages selected from a group consisting of an auto address start, auto address end, offer address, assign address request, confirm address assignment, and acknowledge address confirmation.

An auto address timeout may occur when in absence of activity on the bus for a predetermined period of time.

The platform bus may use a BACNET LAN MS/TP LAN data link protocol for inter-module communication.

An approach for addressing modules on a platform bus may incorporate obtaining a master module on a platform bus, adding one or more slave modules on the platform bus, and running an identification signal line through the modules via the sub-base connectors. The platform bus may be a wire network that runs through sub-base connectors that interlock the modules together. Addressing of the modules may occur automatically in that the master module has a first address by default, and a first slave module adjoining the master module is assigned a second address. A second slave module nearest to the first slave module, if there is a second slave module, may be assigned a third address. Each of the other slave modules, nearest to a preceding slave module assigned an address, may be assigned a next address after an address assigned to the preceding slave module.

The approach may further incorporate running an identification signal line through the modules. The identification signal line may indicate when a module is assigned an address, and when a next adjoining eligible module can be assigned an address.

A flame amplifier may be an ineligible module.

Addresses may be allocated and assigned in a numerical order to each module based on a physical position of the respective module on a rail.

The modules may be put into an auto addressing mode by the base module. The auto addressing mode may be invoked when the modules are powered up. Manual addressing may be invoked and override the auto addressing. Results of the auto addressing may be available at the base module.

A module system having addressing may incorporate a bus, a master module on the bus, and one or more slave modules on the bus. The master module may incorporate a processor. An algorithm for assigning unique addresses to the modules may be automatically performed at the processor at boot-time.

The system may further incorporate an identification signal line running through the modules. The assigning addresses to the slave modules may be performed with a signal via the identification signal line.

A slave module may assume an address, just when assigned an address. A slave module may respond to any message on the bus directed to a specific address.

The bus may be a network, having a voltage differential signal.

The bus may utilize a BACNET MS/TP LAN data link protocol for inter-module communication.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A module addressing mechanism comprising:
   a platform bus;
   a base module on the platform bus; and
   one or more modules besides the base module on the platform bus; and
   wherein:
   the base module is designated as a master on the platform bus;
   the one or more modules besides the base model are designated as slaves on the platform bus;
   the modules do not assume a device address when put on the platform bus;
   the base module puts virtually all of the modules that are slaves into an addressing mode by broadcasting a first message on the platform bus, wherein the first message includes a first proprietary frame message that distinguishes the first message from normal traffic data; and
   after each of virtually all of the modules that are slaves on the platform bus has an assigned address, the base module directs all of the modules to leave the address mode by broadcasting a second message on the platform bus, wherein the second message includes a second proprietary frame message that distinguishes the second message from normal traffic data; and
   the modules are dynamically assigned addresses by an algorithm at boot time of the base module.

2. The mechanism of claim 1 wherein the platform bus runs through sub-base connectors of the modules interlocked together on a structure.

3. The mechanism of claim 1, wherein the platform bus is connected to the modules situated in a series with the series beginning with the base module.

4. The mechanism of claim 3, further comprising:
   an identification signal line that runs through each module; and
   wherein:
   the identification signal line at an input side of the module is routed through the module to an output side; and
   a signal on the identification signal line can be controlled by the module that is presented at the output side to an adjoining module.

5. The mechanism of claim 1, wherein:
   the base module has a first address by default according to the algorithm;

addresses are allocated and assigned to each module according to their position relative to one another;
a first module that is a slave next to the base module is assigned a second address;
if a module is a slave next to the first module, the second module is assigned a third address; and
an assignment of a subsequent address to a module that is a slave next to a module previously assigned an address continues sequentially until each of virtually all modules that are slaves on the platform bus is assigned an address.

6. The mechanism of claim 5, wherein if a module does not participate on the platform bus but is situated adjacent to a module that is a slave on the platform bus, the platform bus passes through the module onto a next adjoining module.

7. The mechanism of claim 1, wherein:
platform bus communication uses proprietary frame messages; and
the proprietary frame messages comprise one or more messages selected from a group consisting of an auto address start, auto address end, offer address, assign address request, confirm address assignment, and acknowledge address confirmation.

8. The mechanism of claim 1, wherein an auto address timeout occurs when in absence of activity on the bus for a predetermined period of time.

9. The mechanism of claim 1, wherein the platform bus uses a BACNET LAN MS/TP LAN data link protocol for inter-module communication.

10. A method for addressing modules on a platform bus comprising:
obtaining a master module on a platform bus;
adding one or more slave modules on the platform bus; and
running an identification signal line through the modules via the sub-base connectors; and
wherein:
the platform bus is a wire network that runs through sub-base connectors that interlock the modules together;
addressing of the modules occurs automatically in that the master module has a first address by default, and a first slave module adjoining the master module is assigned a second address, wherein the addressing of the modules is automatically performed by an algorithm at boot time of the base module;
a second slave module nearest to the first slave module, if there is a second slave module, is assigned a third address;
each of the other slave modules, nearest to a preceding slave module assigned an address, is assigned a next address after an address assigned to the preceding slave module;
the master module puts virtually all of the slave modules into an addressing mode by broadcasting a first message on the platform bus, wherein the first message includes a first proprietary frame message that distinguishes the first message from normal traffic data; and
after each of virtually all of the slave modules on the platform bus has an assigned address, the master module directs all of the slave modules to leave the address mode by broadcasting a second message on the platform bus, wherein the second message includes a second proprietary frame message that distinguishes the second message from normal traffic data.

11. The method of claim 10, further comprising:
running an identification signal line through the modules; and
wherein the identification signal line indicates when a module is assigned an address, and when a next adjoining eligible module can be assigned an address.

12. The method of claim 11, wherein a flame amplifier is an ineligible module.

13. The method of claim 10, wherein addresses are allocated and assigned in a numerical order to each module based on a physical position of the respective module on a rail.

14. The method of claim 10, wherein:
the modules are put into an auto addressing mode by the base module;
the auto addressing mode is invoked when the modules are powered up;
manual addressing can be invoked and override the auto addressing; and
results of the auto addressing are available at the base module.

15. A module system having addressing comprising:
a bus;
a master module on the bus; and
one or more slave modules on the bus; and
wherein:
the master module comprises a processor;
an algorithm for assigning unique addresses to the modules is automatically performed at the processor at boot-time of the master module;
wherein the algorithm instructs the master module to put the one or more slave modules into an addressing mode by broadcasting a first message on the bus, wherein the first message includes a first proprietary frame message that distinguishes the first message from normal traffic data; and
after each of virtually of the one or more slave modules has an assigned address, the master module directs the one or more slave modules to leave the address mode by broadcasting a second message on the bus, wherein the second message includes a second proprietary frame message that distinguishes the second message from normal traffic data.

16. The system of claim 15, further comprising:
an identification signal line running through the modules; and
wherein the assigning addresses to the slave modules is performed with a signal via the identification signal line.

17. The system of claim 16, wherein:
a slave module assumes an address, just when assigned an address; and
a slave module does respond to any message on the bus directed to a specific address.

18. The system of claim 15, wherein the bus is a network, having a voltage differential signal.

19. The system of claim 15, wherein the bus utilizes a BACNET MS/TP LAN data link protocol for inter-module communication.

* * * * *